(12) United States Patent
Lee et al.

(10) Patent No.: US 12,716,709 B2
(45) Date of Patent: Aug. 25, 2026

(54) METHOD FOR ANALYZING THIN FILM AND DEVICE FOR ANALYZING THIN FILM

(71) Applicant: Samsung Display Co., LTD., Yongin-si (KR)

(72) Inventors: Gihyun Lee, Yongin-si (KR); Jaisun Kyoung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 468 days.

(21) Appl. No.: 18/219,606

(22) Filed: Jul. 7, 2023

(65) Prior Publication Data

US 2024/0077303 A1 Mar. 7, 2024

(30) Foreign Application Priority Data

Sep. 5, 2022 (KR) ........................ 10-2022-0111967

(51) Int. Cl.
*G01B 11/06* (2006.01)
*H01J 49/10* (2006.01)

(52) U.S. Cl.
CPC ............ *G01B 11/06* (2013.01); *H01J 49/105* (2013.01)

(58) Field of Classification Search
CPC .... G01B 11/06; G01B 11/0641; H01J 49/105; H01J 49/26; G01N 1/2813; G01N 21/8422; G01N 2001/2893; G01N 21/17; G01N 21/65; G01N 21/718; G01N 27/62
See application file for complete search history.

(56) References Cited

U.S. PATENT DOCUMENTS 5,835,226 A * 11/1998 Berman ............. G01B 11/0625 356/630
6,381,009 B1 * 4/2002 McGahan ............... G01J 3/453 356/73
7,362,435 B1 * 4/2008 Johs ................... G01B 11/0641 356/369
7,427,520 B2 * 9/2008 Kono ................. G01B 11/0641 702/170

(Continued)

FOREIGN PATENT DOCUMENTS

KR 100742982 B1 7/2007
KR 102205597 B1 * 1/2021 ......... G01B 11/0641
KR 1020220034292 A 3/2022

*Primary Examiner* — Michelle M Iacoletti
*Assistant Examiner* — Maher Yazback
(74) *Attorney, Agent, or Firm* — CANTOR COLBURN LLP

(57) ABSTRACT

A method for analyzing a thin film includes: preparing a main sample and a plurality of comparative samples, each of which includes a first layer composed of a first material and a second layer composed of a second material and a third material, the first layer and the second layer being stacked, where each of the plurality of comparative samples has a different amount of the second material from the main sample; measuring optical constants of the main sample and the comparative samples; deriving a linear relation equation between each of the optical constants of the main sample and the comparative samples and the material amount of the second material of a corresponding one of the main sample and the comparative samples; and calculating a material composition ratio of the main sample based on the material amount of the second material of the main sample and the linear relation equation.

22 Claims, 16 Drawing Sheets

(56) References Cited

U.S. PATENT DOCUMENTS

| | | | | |
|---|---|---|---|---|
| 8,004,677 | B2 | 8/2011 | Lee et al. | |
| 10,139,358 | B2 * | 11/2018 | Edge | G01N 21/9501 |
| 2005/0253080 | A1 * | 11/2005 | Janik | G01N 21/211<br>250/372 |
| 2009/0325326 | A1 * | 12/2009 | Park | G01J 4/00<br>356/369 |
| 2014/0119513 | A1 * | 5/2014 | Kim | G01B 15/02<br>378/89 |

* cited by examiner

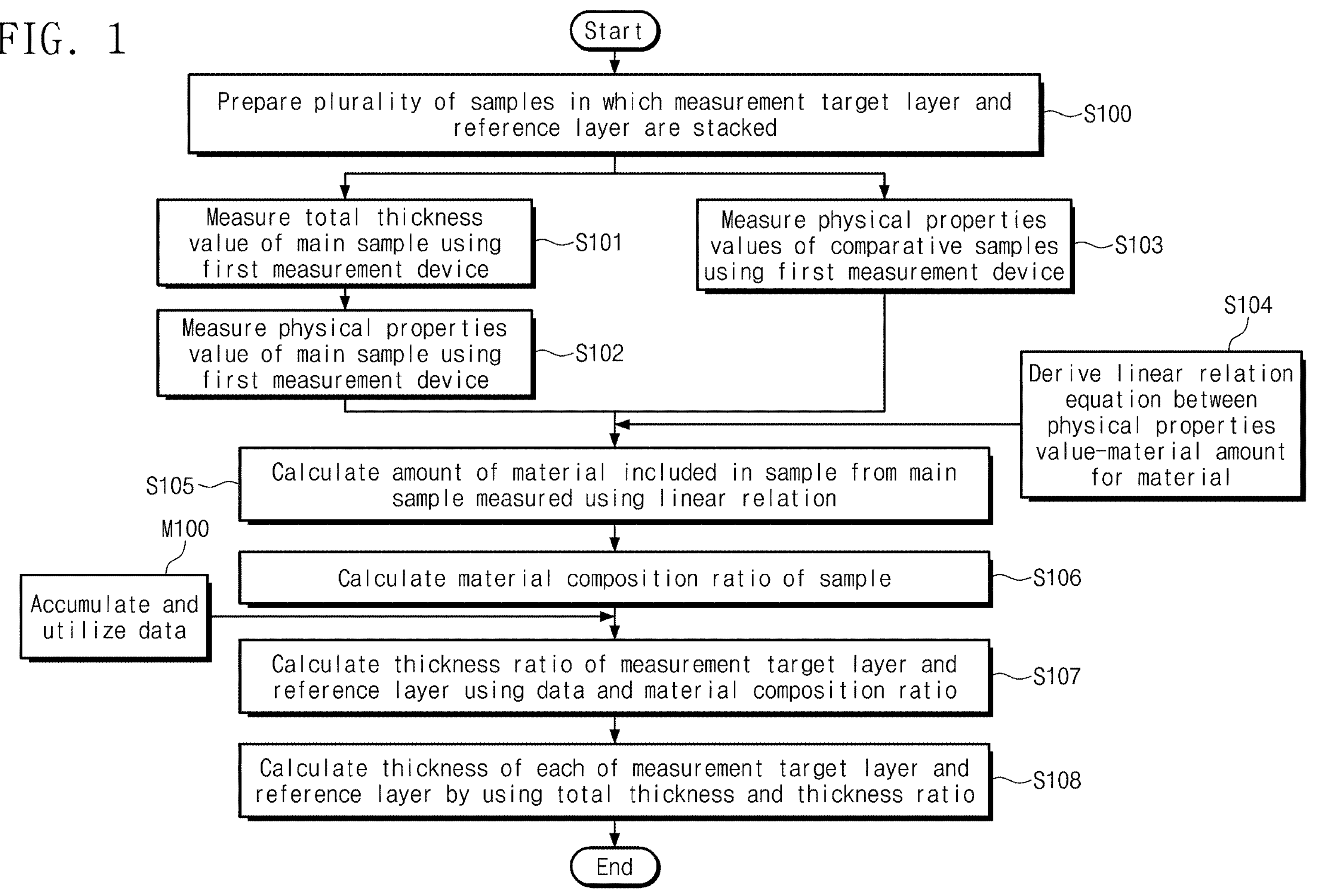
FIG. 1
Start
Prepare plurality of samples in which measurement target layer and reference layer are stacked
S100
Measure total thickness value of main sample using first measurement device
S101
Measure physical properties values of comparative samples using first measurement device
S103
Measure physical properties value of main sample using first measurement device
S102
S104
Derive linear relation equation between physical properties value-material amount for material
S105
Calculate amount of material included in sample from main sample measured using linear relation
M100
Calculate material composition ratio of sample
S106
Accumulate and utilize data
Calculate thickness ratio of measurement target layer and reference layer using data and material composition ratio
S107
Calculate thickness of each of measurement target layer and reference layer by using total thickness and thickness ratio
S108
End 500
Memory Unit
400
Calculation/ Analysis Unit
200
215
Optical Splitter
211
Mass Measurement Unit
201
Light Source
213
Light Detection Unit
111
203
205
207
209
Carrier Source
301 SP
107
Photo-Detector
105
Light Reception Module
101
Light Soure
103
Light Source Module
θ
SP
301
300
100

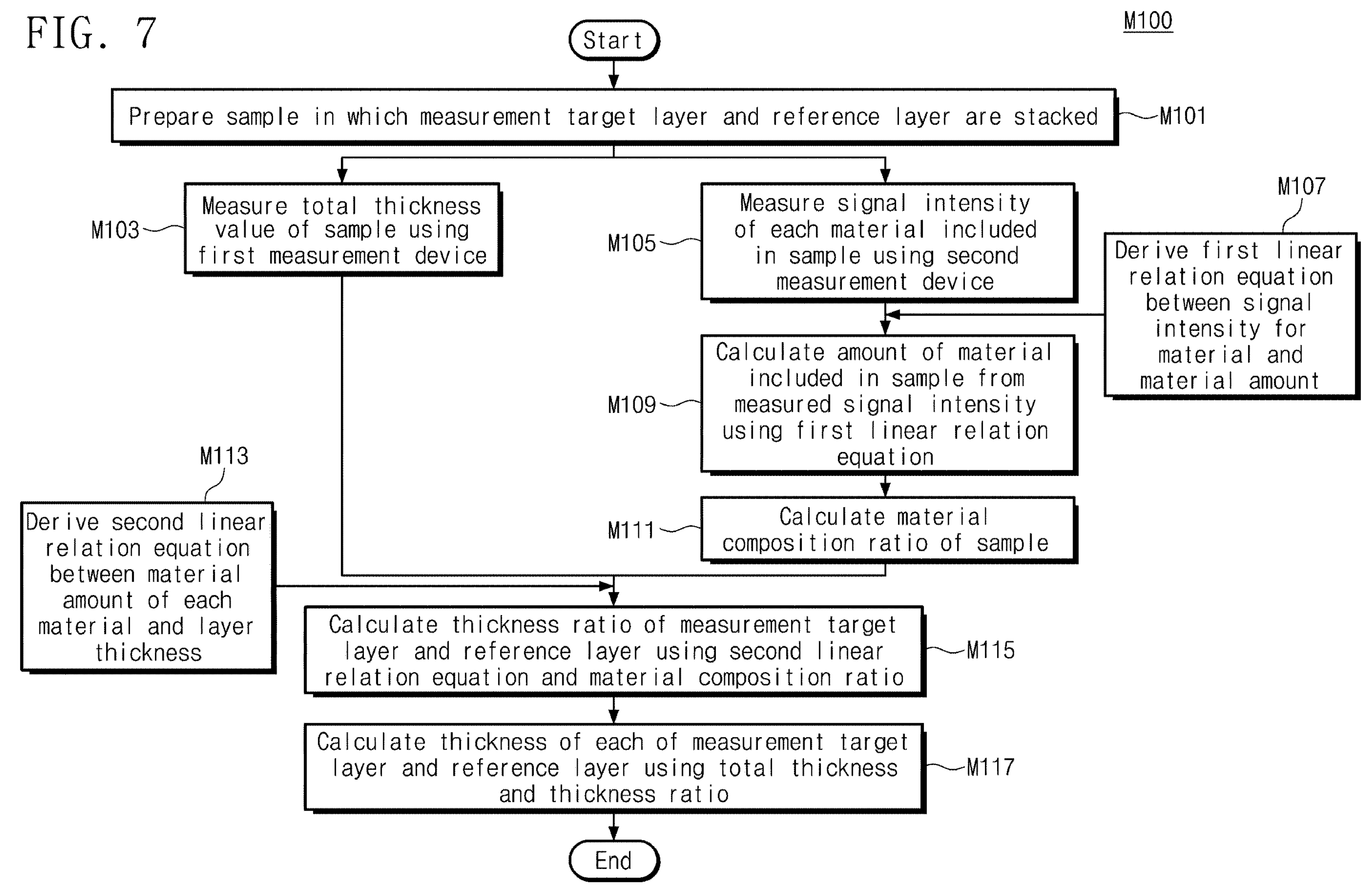
FIG. 7
M100
Start
Prepare sample in which measurement target layer and reference layer are stacked
M101
M103
Measure total thickness value of sample using first measurement device
M105
Measure signal intensity of each material included in sample using second measurement device
M107
Derive first linear relation equation between signal intensity for material and material amount
M109
Calculate amount of material included in sample from measured signal intensity using first linear relation equation
M111
Calculate material composition ratio of sample
M113
Derive second linear relation equation between material amount of each material and layer thickness
Calculate thickness ratio of measurement target layer and reference layer using second linear relation equation and material composition ratio
M115
Calculate thickness of each of measurement target layer and reference layer using total thickness and thickness ratio
M117
End

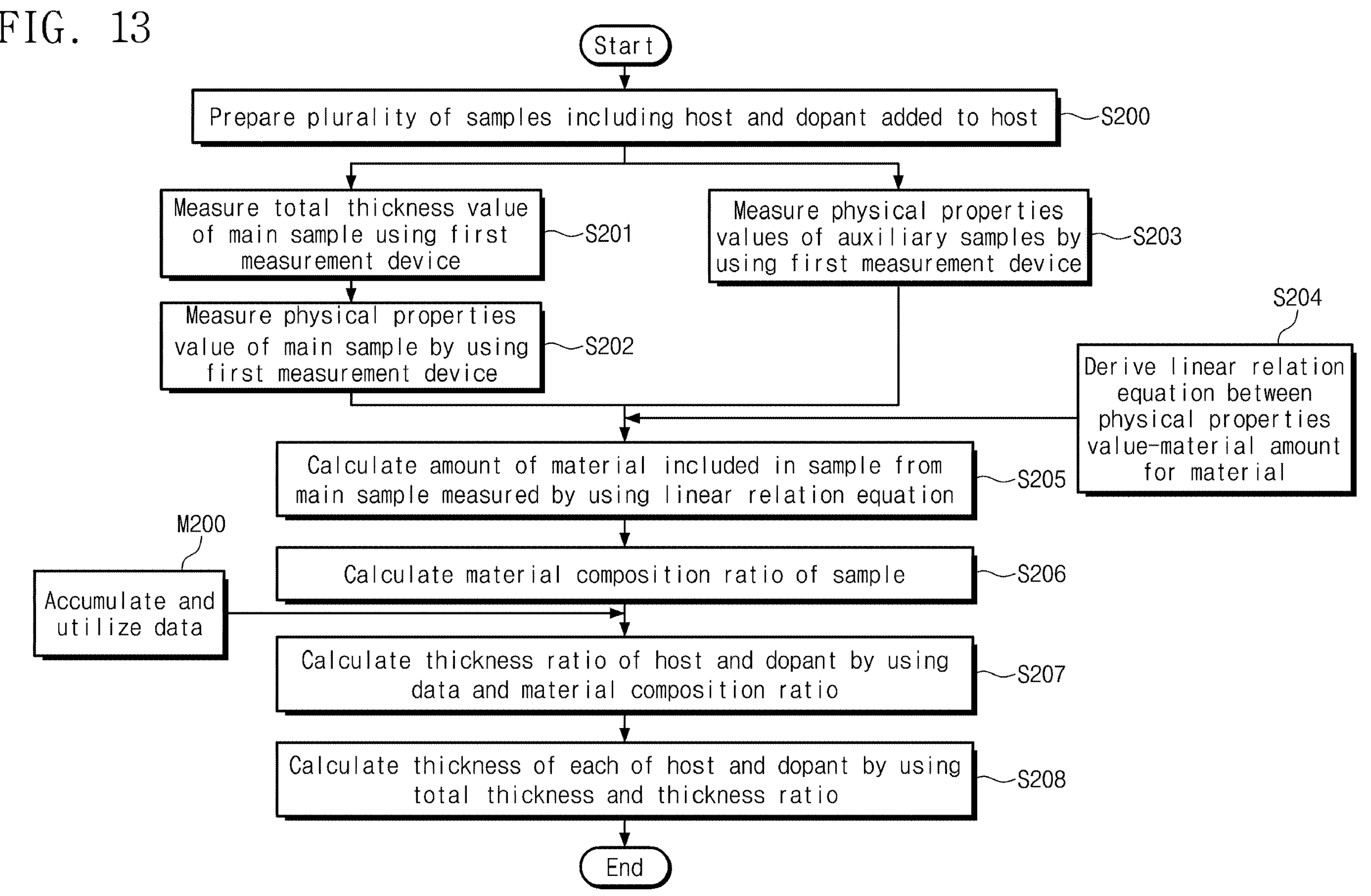
FIG. 13
Start
Prepare plurality of samples including host and dopant added to host
S200
Measure total thickness value of main sample using first measurement device
S201
Measure physical properties value of main sample by using first measurement device
S202
Measure physical properties values of auxiliary samples by using first measurement device
S203
S204
Derive linear relation equation between physical properties value-material amount for material
Calculate amount of material included in sample from main sample measured by using linear relation equation
S205
M200
Accumulate and utilize data
Calculate material composition ratio of sample
S206
Calculate thickness ratio of host and dopant by using data and material composition ratio
S207
Calculate thickness of each of host and dopant by using total thickness and thickness ratio
S208
End

METHOD FOR ANALYZING THIN FILM AND DEVICE FOR ANALYZING THIN FILM

This U.S. application claims priority to Korean Patent Application No. 10-2022-0111967, filed on Sep. 5, 2022, and all the benefits accruing therefrom under 35 U.S.C. § 119, the content of which in its entirety is herein incorporated by reference.

BACKGROUND

The present disclosure herein relates to a thin film analysis method and a thin film analysis device, and more particularly, to a thin film analysis method and a thin film analysis device for a thin film having a thickness equal to or less than the measurement limit of a thin film analysis device.

In a device requiring thin film forming technology, the thin thickness and high uniformity of the film are essential to ensure device performance optimization, miniaturization, and driving reliability.

In general, in order to measure the thickness of a thin film, a method in which a light is incident on a sample and the optical variation of a reflected light thereof is analyzed. Such a method has an issue in that it is difficult to apply the method to a thin film having a thickness equal to or less than a predetermined thickness due to the measurement limit of a thickness measuring means. Accordingly, if the thickness of a thin film optimized in terms of securing device performance and miniaturization corresponds to equal to or less than the measurement limit of a thickness monitoring device, in order to avoid the limit of monitoring, there are cases in which a film is formed to be thicker than the optimized thickness so as to be applied to a device. In this case, there are issues such as an increase in production costs due to material consumption and degradation in device performance due to the formation of a material which exceeds an optimization range.

In addition, in order to secure device performance and take advantage of miniaturization, there is case in which a film is formed equal to or less than the above-described measurement limit at the expense of the absence of suitable monitoring. In this case, even if there is a defect in the thin film, it is difficult to detect and correct the defect through monitoring, so that it is difficult to secure driving reliability of a device.

Meanwhile, various mass spectrometry techniques are used to qualitatively and quantitatively measure constituent materials of a sample. Such a method may be based on the principle of confirming the type of a material and the amount thereof by analyzing a light emitted when a sample material is excited by a light or particles incident on a sample and then returned to a normal state.

SUMMARY

The present disclosure provides a thin film analysis method and a thin film analysis device which are capable of measuring and monitoring the thickness of a thin film having a thickness equal to or less than the measurement limit of a thin film analysis device.

The present disclosure also provides a thin film analysis method and a thin film analysis device which are capable of forming the thickness of a thin film to an optimal value to secure the driving reliability of the device, and simultaneously, prevent an increase in production costs and degradation in device performance.

An embodiment of the invention provides a method for analyzing a thin film, the method including: preparing a main sample and a plurality of comparative samples, each of which includes a first layer composed of a first material and a second layer composed of a second material and a third material, the first layer and the second layer being stacked, where each of the plurality of comparative samples has the same amount of the first material and the third material as the main sample but has a different amount of the second material from the main sample, measuring the total thickness of the main sample, measuring optical constants of the main sample and the comparative samples, deriving a linear relation equation representing a linear relation between the optical constant of each of the main sample and the comparative samples and the material amount of the second material of each of the main sample and the comparative samples, and calculating a material composition ratio of the main sample from the material amount of the second material of the main sample and the linear relation equation.

In an embodiment, the measuring of the total thickness of the main sample and the measuring of optical constants of the main sample and the comparative samples may be performed by a first measurement device.

In an embodiment, at least one of the first layer and the second layer may be a thin film having a thickness equal to or less than a measurement limit of the first measurement device.

In an embodiment, the first measurement device may be a device using a change in the polarization state of a light incident on the main sample or the comparison samples and then reflected from the main sample or the comparison samples.

In an embodiment, the linear relation equation may be derived from the relation between the optical constant of the main sample and the energy of a light incident on the main sample and the relation between the optical constants of the comparative samples and the energy of a light incident on the comparative samples.

In an embodiment, the linear relation equation may be derived from a specific wavelength region of the light incident on the main sample or the comparison samples.

In an embodiment, the optical constant measured in the main sample or one of the comparative samples may be n (refractive index) or k (extinction coefficient).

In an embodiment, each of the first material and the second material may be different from the third material, and each of the first layer and the second layer may be any one among a single metal material, an alloy including a plurality of metal materials, and an organic material.

In an embodiment, the method may further include calculating the thickness of each of the first layer and the second layer by using the material composition ratio of the main sample and the total thickness of the main sample.

In an embodiment, the calculating of the thickness may include utilizing data on the relation between the material amount and the thickness ratio or the relation between the material composition ratio and the thickness ratio, and calculating the thickness of each of the first layer and the second layer by using the total thickness of the main sample and the thickness ratio.

In an embodiment, the method may further include preparing a plurality of first auxiliary samples including the first material and the second material in different amounts, measuring the signal intensity of the first and second materials included in each of the plurality of first auxiliary samples using a second measurement device, deriving a first linear relation equation by calculating a linear relation between the material amount of the first material and the signal intensity thereof and a linear relation between the material amount of the second material and the signal intensity thereof, preparing a plurality of second auxiliary samples having the same thickness of the second layer as that of the main sample and having a different thickness of the first layer from that of the main sample, preparing a plurality of third auxiliary samples having the same thickness of the first layer as that of the main sample and having a different thickness of the second layer from that of the main sample, measuring the total thickness of the plurality of second auxiliary samples and the total thickness of the plurality of third auxiliary samples, measuring the signal intensity of the first material included in each of the plurality of second auxiliary samples, and calculating the measured signal intensity of the first material into a material amount using the first linear relation equation, measuring the signal intensity of the second material included in each of the plurality of third auxiliary samples, and calculating the measured signal intensity of the second material into a material amount using the first linear relation equation, and deriving a second linear equation by calculating a linear relation between the thickness of a layer composed of the first material and the calculated material amount of the first material and a linear relation between the thickness of a layer composed of the second material and calculated the material amount of the second material, wherein the data comprises the first linear relation equation and the second linear equation.

In an embodiment, the signal intensity measured by the second measurement device may be measured by at least one of Inductive Coupled Plasma-Mass Spectrometry ("ICP-MS"), Raman Spectroscopy, Time of Flight Secondary Ion Mass Spectrometry ("TOF-SIMS"), or laser induced decay spectroscopy (Laser Induced Breakdown Spectroscopy, "LIBS").

In an embodiment of the invention, a method for analyzing a thin film includes preparing a main sample in which a first layer and a second layer which are composed of a plurality of materials are stacked, and a plurality of comparative samples composed of a plurality of materials substantially the same as those of the sample, wherein one of the plurality of materials is a comparative material having a different amount of material compared to the main sample, measuring the total thickness of the main sample, measuring optical constants of the main sample and the comparative samples, deriving a linear relation equation representing a linear relation between each of the optical constants of the main sample and the comparative samples and the material amount of the main sample and each of the comparative materials among the comparative samples, and calculating the material composition ratio of the main sample from the material amount of a material corresponding to the comparative material among the plurality of materials of the main sample and the linear relation equation.

In an embodiment, the measuring of the total thickness of the main sample and the measuring of optical constants of the main sample and the comparative samples are performed by a measurement device, wherein the measurement device is a device using a change in a polarization state from a light incident on the main sample or the comparison samples into a light reflected from the main sample or the comparison samples.

In an embodiment, in the deriving of a linear relation equation, the linear relation equation may be derived from the relation between the measured optical constant of the main sample and the energy of a light incident on the main sample and the relation between the measured optical constants of the comparative samples and the energy of a light incident on the comparative samples.

In an embodiment, the optical constant measured in the main sample or the comparative samples may be at least one of n (refractive index) and k (extinction coefficient).

In an embodiment, the method may further include: calculating the thickness of each layer composed of the plurality of materials by using the material composition ratio of the main sample and the total thickness of the main sample, wherein the calculating of the thickness includes utilizing data on the relation between the material amount and the thickness ratio or the relation between the material composition ratio and the thickness ratio, and calculating the thickness of each layer by using the total thickness of the main sample and the thickness ratio.

In an embodiment of the invention, a device for analyzing a thin film includes a measuring unit disposed on a sample stage and configured to measure the total thickness of a sample or the optical constant of the sample, a memory unit configured to store data on the optical constant of an auxiliary sample substantially the same as the sample, and a calculation unit configured to receive the total thickness value of the sample and the optical constant of the sample measured by the measuring unit, and the data from the memory unit and calculate the thickness of each of a plurality of thin film layers included in the sample.

In an embodiment, in the memory unit, data on the optical constant of the auxiliary sample, the relation between a material amount and the optical constant, the relation between the material amount and a material composition ratio, the relation between the material amount and a layer thickness, and the like may be stored.

In an embodiment, the device may further include a first sub-measurement unit configured to measure a total thickness value of the auxiliary sample, a second sub-measurement unit configured to quantitatively measure materials included in the auxiliary sample to measure a signal intensity value, and a sub-calculation unit configured to receive the total thickness value and the signal intensity value obtained from the first sub-measurement unit and the second sub-measurement unit, and calculate the thickness of each of a plurality of thin film layers included in the auxiliary sample, wherein the first sub-measurement unit, the second sub-measurement unit, and the sub-calculation unit accumulatively generate data accumulated in the memory unit.

In an embodiment, the data accumulated in the memory unit may further include data calculated from the measurement unit and the calculation unit.

In an embodiment, the sub-calculation unit may include a first sub-calculation unit configured to calculate and store a first linear relation equation representing a linear relation between the material amount and signal intensity of a material included in the auxiliary sample, and a second linear relation equation representing a linear relation between the material amount and a layer thickness of the material, and a second sub-calculation unit configured to calculate a material composition ratio of the auxiliary sample by using the first linear relation equation and the signal intensity value of the material included in the auxiliary sample, calculate a thickness ratio of the thin film layers constituting the auxiliary sample by using the material composition ratio and the second linear relation equation, and calculate the thickness of each of the first and second layers by using the total thickness value and the thickness ratio.

In an embodiment, the measuring device or the first sub-measurement device may be a device using a change in a state from a light incident on the sample into a light reflected from the sample.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 1 is a flow chart showing each step of a method for analyzing a thin film according to an embodiment of the invention;

FIG. 7 is a flow chart specifically showing one step of the method for analyzing a thin film of FIG. 1;

FIG. 13 is a flow chart showing each step of a method for analyzing a thin film according to another embodiment of the invention.

DETAILED DESCRIPTION

Figure 2A:
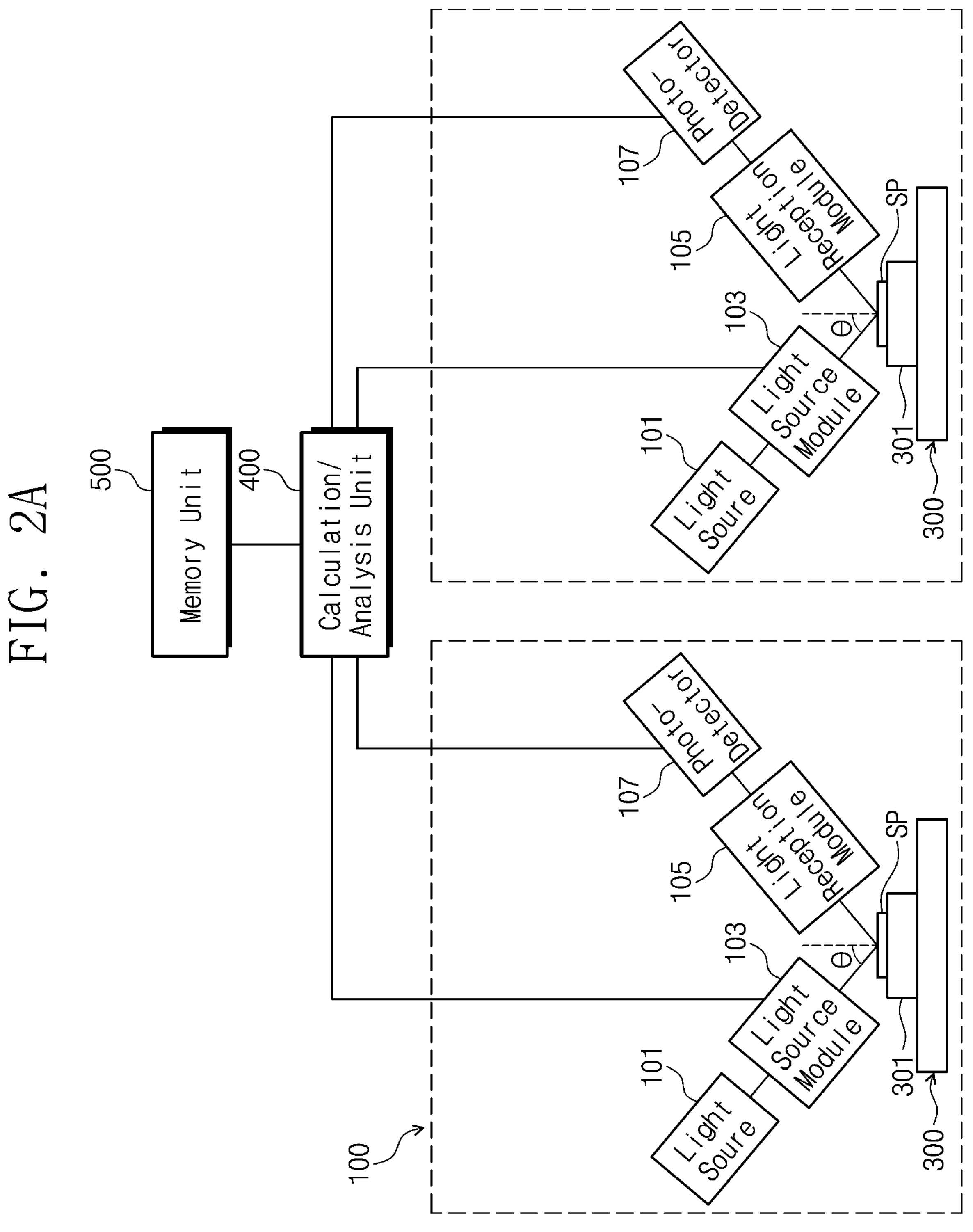
FIG. 2A to FIG. 2C are diagrams showing a device for analyzing a thin film according to an embodiment of the invention.

In the present disclosure, when an element (or a region, a layer, a portion, and the like) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the invention will be described with reference to the accompanying drawings.

FIG. 1 is a flow chart showing each step of a method for analyzing a thin film according to an embodiment of the invention.

Referring to FIG. 1, the method for analyzing a thin film may include: preparing a plurality of samples in which a measurement target layer and a reference layer are stacked (S100), measuring a total thickness value of a main sample using a first measurement device (S101), measuring a physical properties value of the main sample using the first measurement device (S102), measuring physical properties values of comparative samples using the first measurement device (S103), deriving a linear relation equation between a physical properties value–a material amount for a material (S104), calculating an amount of material included in a sample from the main sample measured using the linear relation equation (S105), calculating a material composition ratio of the sample (S106), calculating a thickness ratio of a measurement target layer and the reference layer using data and the material composition ratio (S107), calculating the thickness of each of the measurement target layer and the reference layer by using the total thickness and thickness ratio (S108), and accumulating and utilizing the data (M100).

First, a thin film analysis device and a sample SP (see FIG. 2) to be measured may be prepared. In this case, the sample SP may be provided as a main sample, an auxiliary sample, or comparative samples. The main sample, the auxiliary sample, or the comparative samples may be composed of the same materials, but may differ in the amount of some materials. As an example, the main sample and the comparative samples may differ in the amount of one material, and the amount of the one material may be differently provided even among the comparative samples. However, the embodiment of the invention is not limited thereto, and the main sample and the comparative samples may include a plurality of materials in different amounts.

In the invention, through a linear relation equation of material amount—physical properties value to be described later using auxiliary samples or comparative samples, a material amount of the main sample may be obtained through a physical properties value of the main sample measured through a measurement device. Specifically, the material composition ratio of each material constituting the main sample is obtained, and using the obtained material composition ratio and data to be described later, a layer thickness of each material constituting the main sample may be derived. In this case, information which may be derived is not limited to the layer thickness of each material.

Figure 2B:
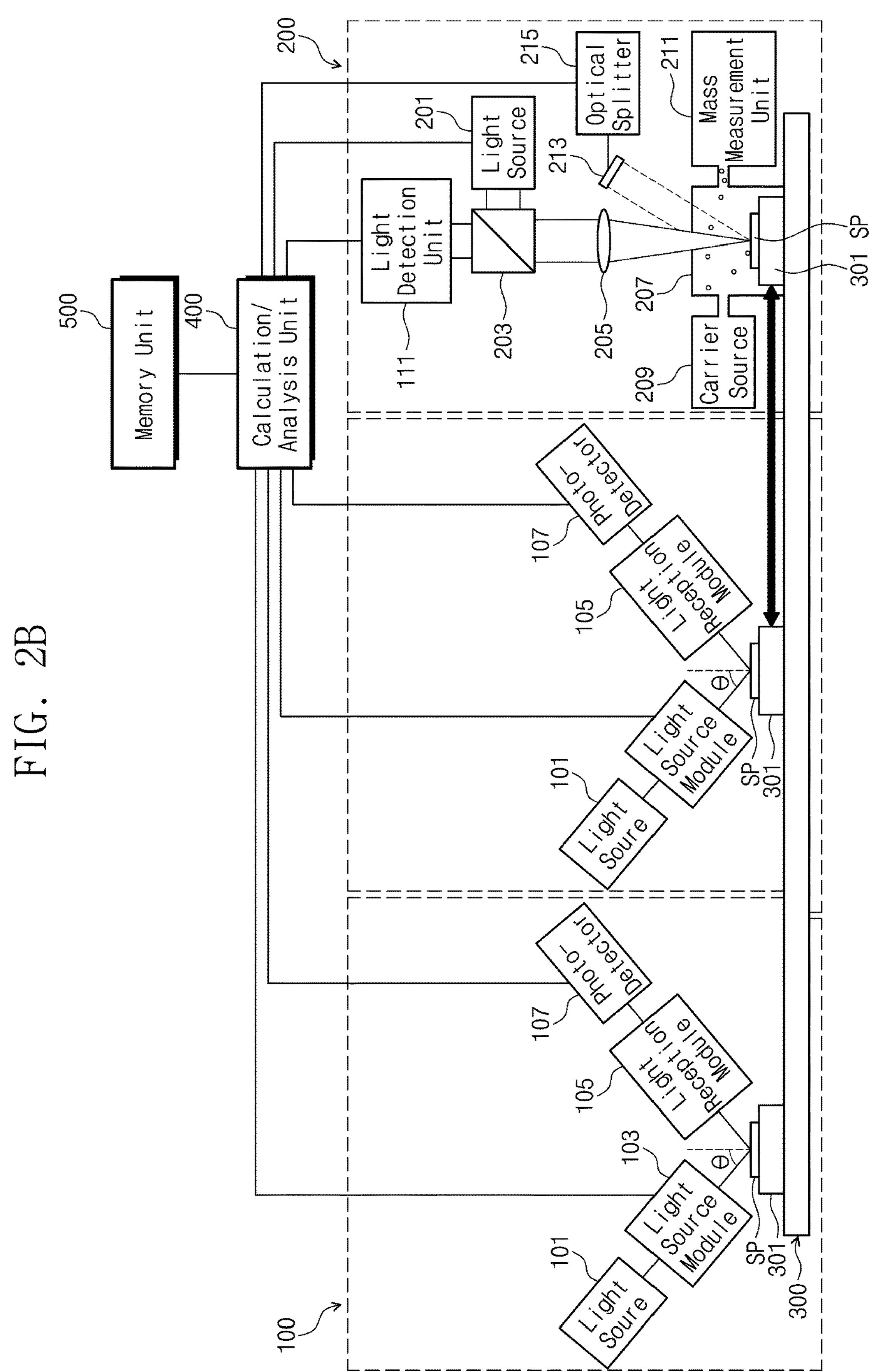
Figure 2C:
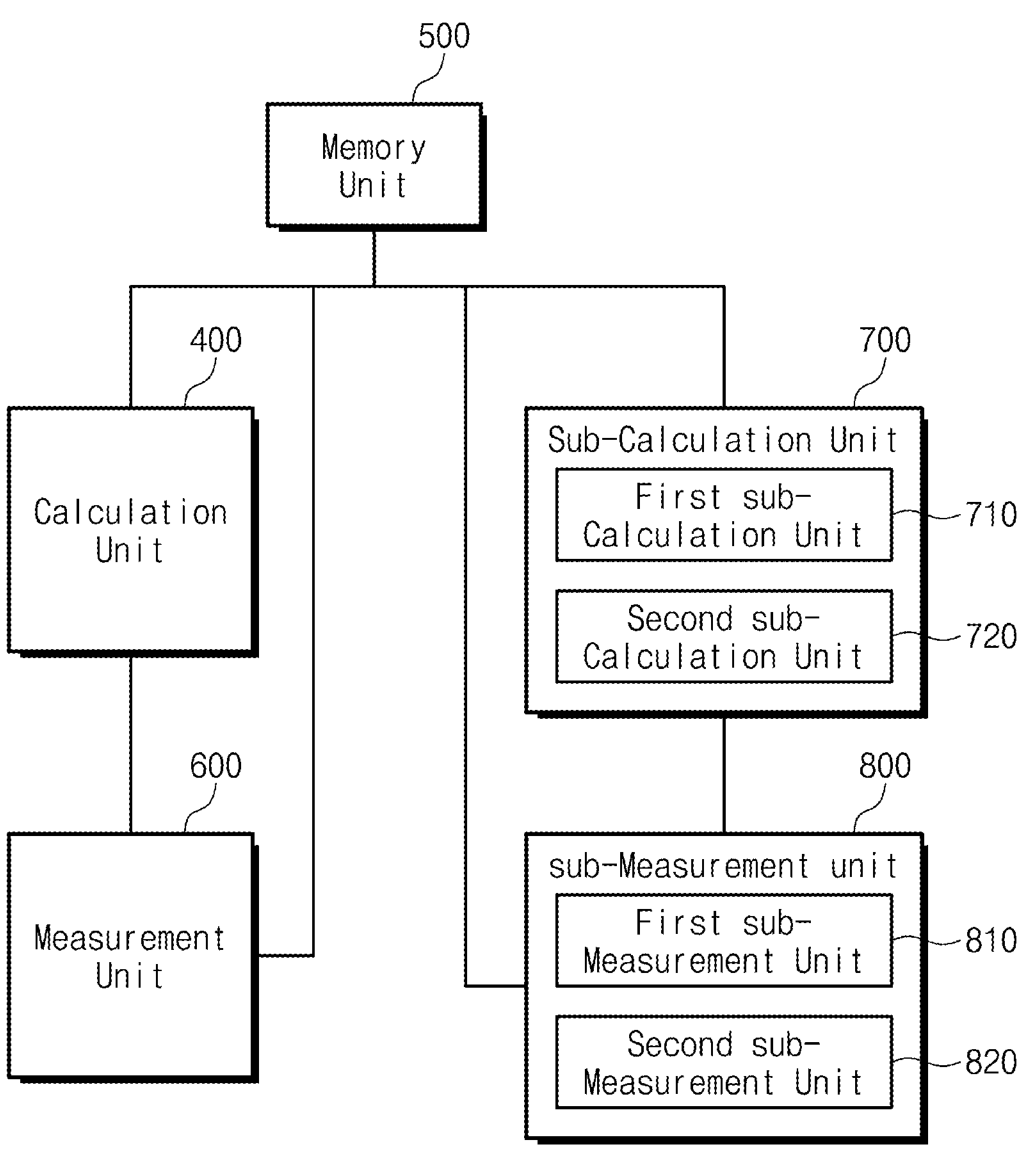
Figure 3:
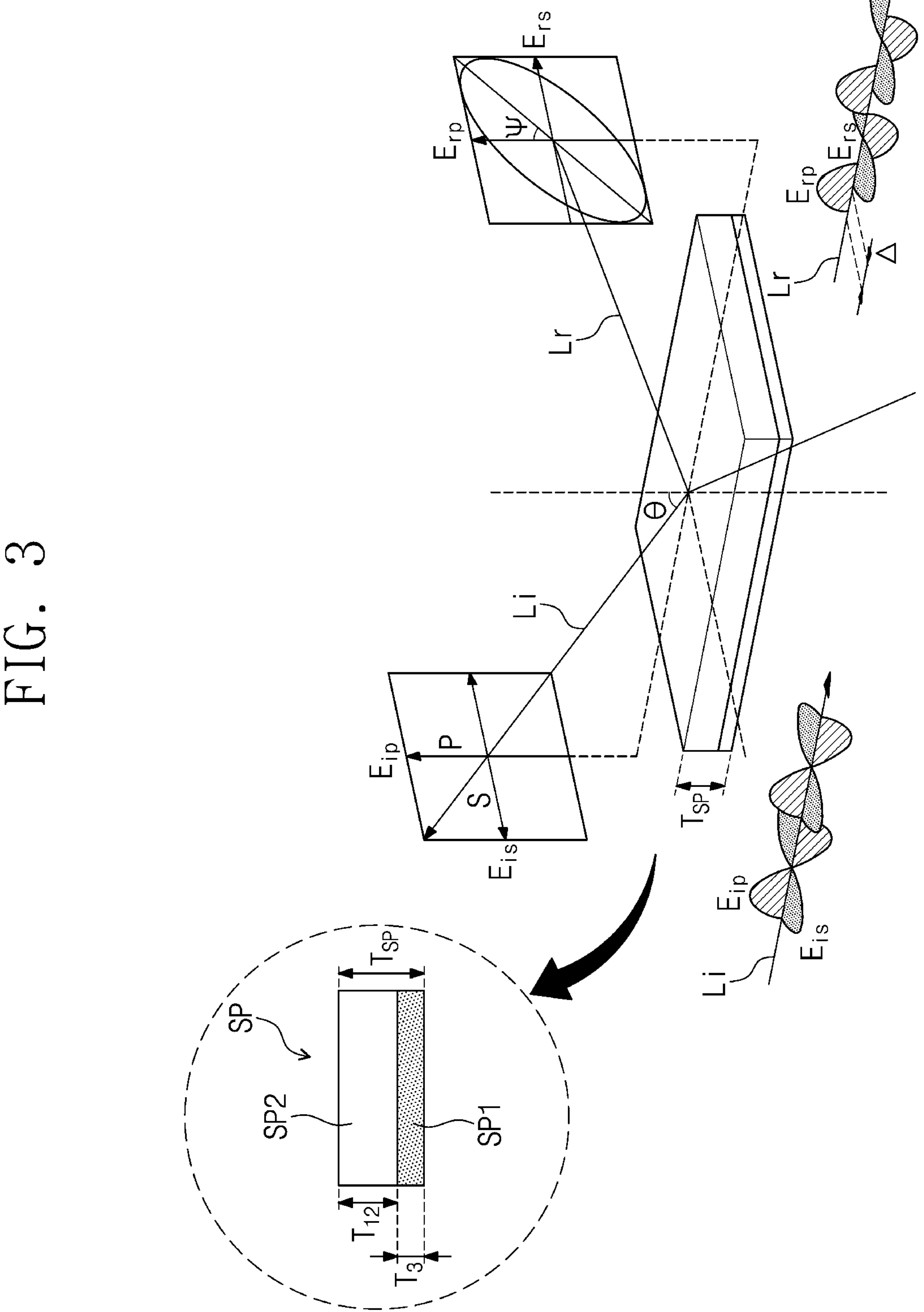
FIG. 3 is a diagram for describing a thickness measurement principle of the thin film analysis devices of FIG. 2A and FIG. 2B.

FIG. 2A to FIG. 2C are diagrams showing a device for analyzing a thin film according to an embodiment of the invention, and FIG. 3 is a diagram for describing a thickness measurement principle of the thin film analysis devices of FIG. 2A to FIG. 2C.

Referring to FIG. 2A, the device for analyzing a thin film may include a first measurement device 100. In addition, the device for analyzing a thin film may include a calculation unit 400 and a memory unit 500 which are to be described later.

The first measurement device 100 may include a transport stage 300 and a sample stand 301. The sample SP may be seated and fixed on the sample stand 301 disposed on the transport stage 300.

As illustrated in the drawings, a plurality of first measurement devices 100 may be provided. However, the embodiment of the invention is not limited thereto, and one first measurement device 100 may be provided in another embodiment.

The plurality of first measurement devices 100 may measure the physical properties value of the main sample or the comparative samples having different material amounts from each other. Samples SP which differ in the amount of some materials may be disposed on each sample stand 301, so that each measurement unit 600 (see FIG. 2C) may measure the physical properties value of each of the samples SP which differ in the amount of some materials.

Since the physical properties value of the sample SP may be measured in each of the plurality of first measurement devices 100, it is possible to shorten the time taken to measure a total thickness value of a plurality of the samples SP or an optical constant of the plurality of the samples SP.

Referring to FIG. 2A and FIG. 3, the first measurement device 100 may be a device such as a focus ellipsometer using the principle of calculating a total thickness Tsp of the sample SP based on parameters Δ and Ψ representing changes in polarization state from a light Li having a specific polarization state and incident on the sample SP to a reflected light Lr reflected from the sample SP. Electric field vectors of the light Li and Lr have an s-wave or a p-wave depending on whether the electric field vectors are on an incident surface of a sample surface or perpendicular to the incident surface. Electric field vectors Eip and Eis of the incident light Li and electric field vectors Erp and Ers of the reflected light Lr reflected from the sample SP differ in size and phase. That is, the electric field vectors for the p-waves Eip and Erp are perpendicular to the incident surface, and the electric field vectors for the s-waves Eis and Ers are on the incident surface. The Ψ is a plurality reflection coefficient ratio of the reflected light Lr to the incident light Li, and the Δ is a phase difference between the p wave (Erp) and the s wave (Ers) of the reflected light Lr.

Specifically, the first measurement device 100 may have a light source 101, a light source module 103, a light receiver module 105, and a photodetector 107. The light source 101 may be configured to provide light incident at a specific incident angle θ rather than incident perpendicular to an incident surface of the sample SP, and the light may be polarized through the light source module 103 in which a linear polarizer rotates at a constant speed. The incident light Li polarized in the light source module 103 is reflected from the surface of the sample SP, and the reflected light Lr with a changed polarization state according to optical properties of the sample SP may be collected in the light reception module 105. The light reception module 105 may include a linear polarizer, etc., and may transmit only a specific polarization component. Light passed through the light receiver module 105 may be detected by the photodetector 107 as the signal intensity of a current or a voltage. Elliptic measurement angles Ψ and Δ are obtained by signal analysis for the reflected light Lr, and physical quantities such as the thickness of the sample SP and the like may be extracted on the basis of the elliptic measurement angles.

According to an embodiment of the invention, the thin film analysis method and thin film analysis device are not limited to the above-described elliptic measurement method, and may be based on the principles of various thickness measurement devices. That is, the first measurement device 100 of a thin film thickness measurement method and the thin film analysis device may be a null ellipsometer which finds an extinction point by adjusting a linear polarizer and a compensator, a rotating-polarizer ellipsometer in which a linear polarizer of a light source module rotates at a constant speed, a rotating-analyzer ellipsometer in which a linear polarizer of a light reception module rotates at a constant speed, a rotating-compensator ellipsometer in which a compensator of a light receiver module rotates at a constant speed, or the like.

Referring to FIG. 2B, the device for analyzing a thin film may include a second measurement device 200 along with the first measurement device 100. The same reference numerals are given to the same components as those described with reference to FIG. 2A, and descriptions thereof will be omitted.

The second measurement device 200 may be a device operating based on the principle of confirming the type and amount of a sample material. For example, the second measurement device 200 may be a device using the principle of Inductive Coupled Plasma-Mass Spectrometry (ICP-MS), and may quantitatively detect ionized atoms by extracting electrons in a process of ionizing the sample material and then generating free electrons and atoms.

The second measurement device 200 may include a light source 201, an optical splitter 203, an objective lens 205, a chamber 207, a carrier source 209, a mass measurement unit 211, a focusing lens 213, a spectrometer 215 (in other words, "optical splitter"), and a light detection unit 111.

Specifically, the sample SP to be analyzed is introduced into the chamber 207, and the sample SP may be atomized and ionized by a carrier gas formed from the carrier source 209 and a laser projected through the optical splitter 203 and the objective lens 205 from the light source 201. The ionized sample SP is introduced into the mass measurement unit 211, and the mass measurement unit 211 may output a signal intensity value for the concentration of each material constituting the sample SP. The focusing lens 213 and the spectrometer 215 may collect light generated by the sample SP in the chamber 207. The calculation unit 400 may analyze types of materials included in the sample SP based on data collected from the spectrometer 215.

However, the second measurement device 200 according to an embodiment of the invention is not limited to an inductive coupled plasma-mass spectrometer, and may use principles of Raman Spectroscopy, Time of Flight Secondary Ion Mass Spectrometry (TOF-SIMS), or Laser Induced Breakdown Spectroscopy (LIBS) in another embodiment.

In this case, the sample stand 301 may be in a first position mode disposed in the first measurement device 100 or in a second position mode disposed in the second measurement device 200 by the movement of the transport stage 300.

Referring to FIG. 2C, the thin film analysis device may include the measurement unit 600, the memory unit 500, the calculation unit 400, a sub-measurement unit 800, and a sub-calculation unit 700.

The measurement unit 600 may measure the total thickness of the sample or the optical constant of the sample. In this case, the measurement unit 600 may be the first measurement device 100 of FIG. 2A.

The memory unit 500 may store data on a physical properties value of an auxiliary sample which is substantially the same as the sample SP of FIG. 2A. The data stored in the memory unit 500 may then be utilized in a method of analyzing a thin film.

The auxiliary sample may be any one of a main sample and comparative samples to be described later. The auxiliary sample may substantially be the same as the main sample or the comparative samples. Here, the term "substantially the same" includes a case of being composed of the same materials but being different in the amount of some materials. That is, the auxiliary sample may be composed of the same materials as the materials of the main sample or the comparative sample, and may be the same in the amount of all of the materials, or different in the amount of some materials.

The memory unit 500 may store data on the physical properties value of the auxiliary sample, specifically an optical constant of the auxiliary sample, the relation between a material amount and the optical constant, the relation between the material amount and a material composition ratio, the relation between the material amount and a layer thickness, and the like. As an example, the memory unit 500 may store information on the relation between an optical constant n (refractive index) or k (extinction coefficient) of the auxiliary sample and a composition ratio of a material constituting the auxiliary sample, or information on the relation between the n or k and a layer thickness of the material constituting the auxiliary sample.

The data stored in the memory unit 500 may be data measured by the sub-measurement unit 800 and derived from the sub-calculation unit 700 to be described later. In addition, the embodiment of the invention is not limited thereto, and the data may be data measured by the measurement unit 600 and derived from the calculation unit 400 in another embodiment.

The data stored in the memory unit 500 is not limited to data measured and derived in the aforementioned measurement unit 600, the sub-measurement unit 800, the calculation unit 400, or the sub-calculation unit 700, and may be data measured and derived using other analysis methods and other analysis devices.

The calculation unit 400 may receive the total thickness value of the sample and the optical constant of the sample measured by the measurement unit 600 and the data from the memory unit 500, and may calculate the thickness of each of a plurality of thin film layers included in the sample.

The sub-measurement unit 800 may include a first sub-measurement unit 810 and a second sub-measurement unit 820. The first sub-measurement unit 810 may measure the total thickness value of the auxiliary sample. The second sub-measurement unit 820 may measure a signal strength value by quantitatively measuring materials included in the auxiliary sample.

In this case, the first sub-measurement unit 810 may be the first measurement device 100, and the second sub-measurement unit 820 may be the second measurement device 200 of FIG. 2B. However, in another embodiment, the first sub-measurement unit 810 and the second sub-measurement unit 820 are not limited thereto, and may be measurement devices capable of performing the same functions as the functions of the first measurement device 100 and the second measurement device 200, respectively.

The sub-calculation unit 700 may receive the total thickness value and the signal intensity value of the auxiliary sample obtained from the first sub-measurement unit 810 and the second sub-measurement unit 820, respectively. The sub-calculation unit 700 may calculate the thickness of each of the plurality of thin film layers included in the auxiliary sample through the received values.

The sub-calculation unit 700 may include a first sub-calculation unit 710 and a second sub-calculation unit 710.

The first sub-calculation unit 710 may calculate and store a first linear relation equation representing the linear relation between the material amount and the signal intensity of a material included in the auxiliary sample, and a second linear relation equation representing the linear relation between the material amount and a layer thickness of the material.

The second sub-calculation unit 720 may calculate a material composition ratio of the auxiliary sample by using the first linear relation equation and the signal intensity value of the material included in the auxiliary sample, calculate a thickness ratio of the thin film layers constituting the auxiliary sample by using the material composition ratio and the second linear relation equation, and calculate the thickness of each of the first and second layers by using the total thickness value and the thickness ratio.

Data measured by the first sub-measurement unit 810 and the second sub-measurement unit 820 and data calculated by the sub-calculation unit 700 may be stored in the memory unit 500. That is, the first sub-measurement unit 810, the second sub-measurement unit 820, and the sub-calculation unit 700 may accumulatively generate data to be accumulated in the memory unit 500.

Hereinafter, specific operations of the sub-measurement unit 800 and the sub-calculation unit 700 will be described in detail below with reference to FIG. 7.

Referring to FIG. 3, the sample SP to be measured may be provided in a plurality. As an example, the sample may have a structure in which a first layer SP1 and a second layer SP2 composed of a plurality of materials are stacked.

In this case, a thickness T3 of the first layer SP1 may be within a range equal to or less than a measurement limit of the first measurement device 100 (see FIG. 2A) and thus, not be measurable with only the first measurement device 100, but a total thickness TSP of the sample SP is a thickness obtained by adding the thickness T3 of the first layer SP1 and a thickness T1 of the second layer SP2, and may be within a range equal to or greater than the measurement limit of the first measurement device 100. In this case, the first measurement device 100 may be a device using a change in the polarization state of a light incident on the samples SP and then reflected from the samples SP.

In this case, one of the first layer SP1 and the second layer SP2 may be a measurement target layer, and the other one thereof may be a reference layer.

The first layer SP1 and the second layer SP2 are composed of different materials. The first layer SP1 and the second layer SP2 may be different metal materials, but are not limited thereto. In some embodiments, the second layer SP2 may be an alloy composed of at least two different types of metal materials.

As an example, the first layer SP1 may be composed of an ytterbium (Yb) metal, and the second layer SP2 may be composed of a silver-magnesium (AgMg) alloy.

However, the invention is not limited thereto, and even if the second layer SP2 is composed of a single material, a sample may be used as the sample SP to be measured by the thin film analysis method and the thin film analysis device of the invention. In addition, the sample SP may be a sample including a host and a dopant doped in the host, and is not limited to any one embodiment.

Hereinafter, referring to FIG. 1 and FIG. 3, a thin film analysis method using the thin film analysis device according to an embodiment of the invention will be described.

First, the thin film analysis device and a sample SP to be measured may be prepared (S100). In this case, the sample SP may be provided as a main sample, an auxiliary sample, or comparative samples. The main sample, the auxiliary sample, or the comparative samples may be composed of the same materials, but may differ in the amount of some materials. As an example, the main sample and the comparative samples may differ in the amount of one material, and the amount of the one material may be differently provided even among the comparative samples. However, the embodiment of the invention is not limited thereto, and the main sample and the comparative samples may include a plurality of materials in different amounts.

In the invention, through a linear relation equation of material amount—physical properties value to be described later using auxiliary samples or comparative samples, a material amount of the main sample may be obtained through a physical properties value of the main sample measured through a measurement device. Specifically, the material composition ratio of each material constituting the main sample is obtained, and using the obtained material composition ratio and data to be described later, a layer thickness of each material constituting the main sample may be derived. In this case, information which may be derived is not limited to the layer thickness of each material.

As an example, the first layer SP1 of the main sample or the comparative samples may be composed of an ytterbium (Yb) metal, and the second layer SP2 thereof may be composed of a silver-magnesium (AgMg) alloy.

Specifically, the main sample may be composed of the first layer SP1 which is composed of a first material and the second layer SP2 which composed of a second material and a third material, and the comparative samples may also be composed of the first layer SP1 which is composed of a first material and the second layer SP2 which is composed of a second material and a third material.

According to an embodiment of the invention, the first material may be an ytterbium (Yb) metal. The second material may be magnesium (Mg), and the third material may be a silver (Ag) metal.

That is, the first layer SP1 may be an ytterbium metal, and the second layer SP2 may be a silver-magnesium alloy. However, each material and layer may be changed without being limited to any one embodiment.

In this case, each of the main sample and the comparative samples may a different amount of the second material, that is, magnesium (Mg).

After the preparation step S100, the main sample is positioned in the thin film analysis device, and using the thin film analysis device, the total thickness Tsp of the main sample is measured (S101). In addition, measuring a physical properties value of the main sample (S102) and measuring a physical properties value of the comparative sample may each be performed.

In this case, the physical properties value may be an optical constant, and specifically, may be n (refractive index), or k (extinction coefficient). Hereinafter, for convenience of description, the physical properties value is referred to as an optical constant. However, the physical properties value is not limited to the optical constant, and may represent another specific constant of a material.

The total thickness of the main sample may be measured by the first measurement device 100 (see FIG. 2A). In addition, the optical constant of the main sample may be measured by the first measurement device 100. The optical constant of the comparative sample may be measured by the first measurement device 100. However, the embodiment of the invention is not limited thereto, and the optical constant of the comparative sample may be measured by another measurement device performing the same function as that of the first measurement device 100 and is not limited to any one device.

Figure 4:
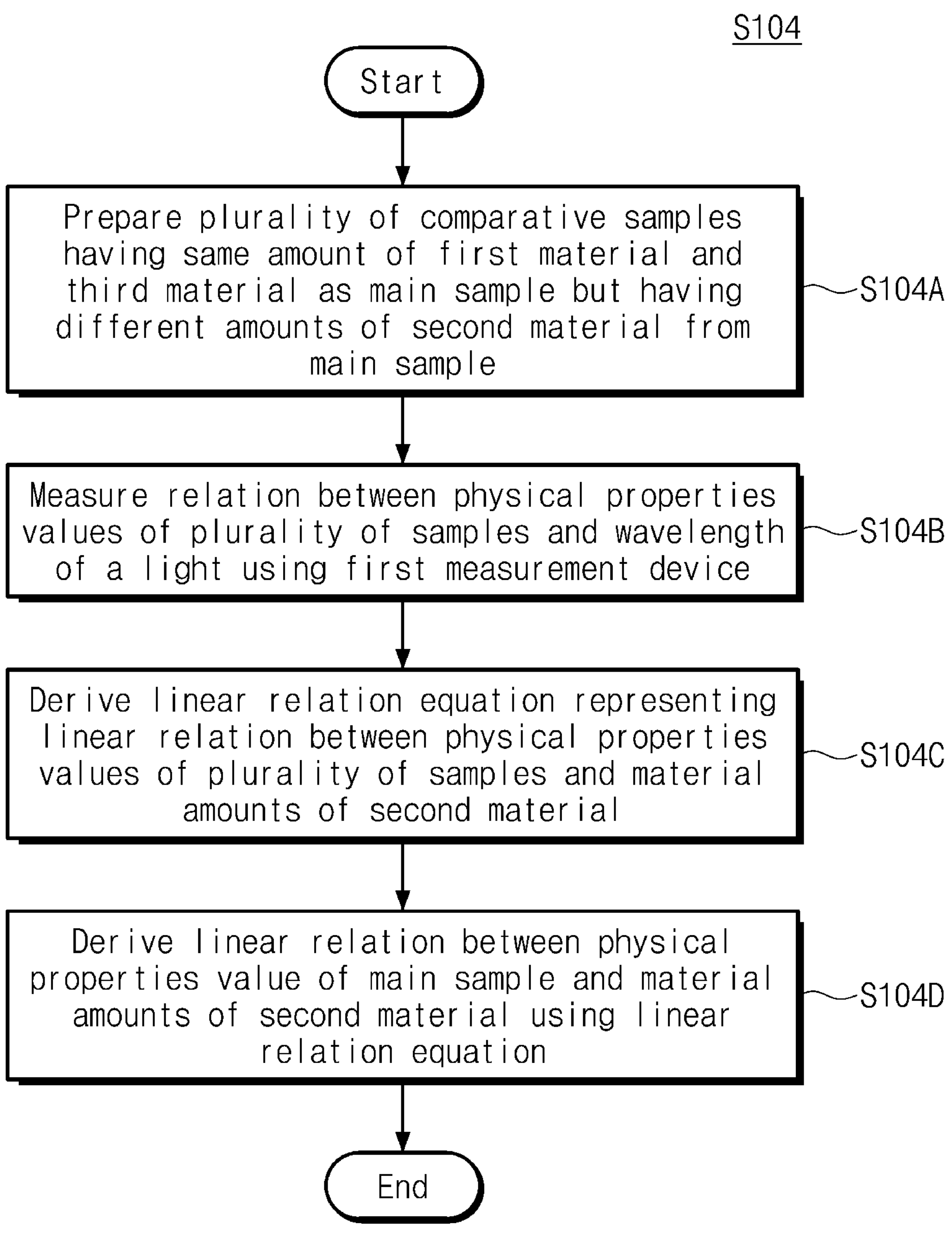
FIG. 4 is a flow chart specifically showing one step of the method for analyzing a thin film of FIG. 1.

FIG. 4 is a flow chart specifically showing one step of the method for analyzing a thin film of FIG. 1. Specifically, FIG. 4 is a diagram embodying the deriving of a linear relation between a material amount and a physical properties value (S104).

The deriving of a linear relation between the material amount and the physical properties value (S104) may perform preparing a plurality of comparative samples each having the same amount of the first material and the third material as the main sample but having different amounts of the second material from the main sample (S104A), measuring a relation between physical properties values of the plurality of samples and the wavelength of a light using the first measurement device 100 (S104B), deriving a linear relation equation representing a linear relation between the physical properties values of the plurality of samples and the material amounts of the second material (S104C), and deriving a linear relation between the physical properties value of the main sample and the material amounts of the second material using the linear relation equation (S104D).

A linear relation between the optical constant of each of the comparative samples and the material amounts of each of the comparative samples may be derived. Hereinafter, for convenience of description, the material amount is referred to as concentration. However, the material amount is not limited to the concentration, and may represent other material amounts such as a molar concentration, a molal concentration, and the like.

Specifically, optical constants of the plurality of comparative samples may be measured through the first measurement device 100. In this case, the concentration of each of the plurality of comparative samples may be set when the comparative samples are prepared. That is, on the basis of the material amount known for each auxiliary sample in the sample preparation step and the optical constant value measured by the first measurement device 100, a linear relation equation between the material amount and a signal intensity for each of the auxiliary samples may be derived.

Figure 5A:
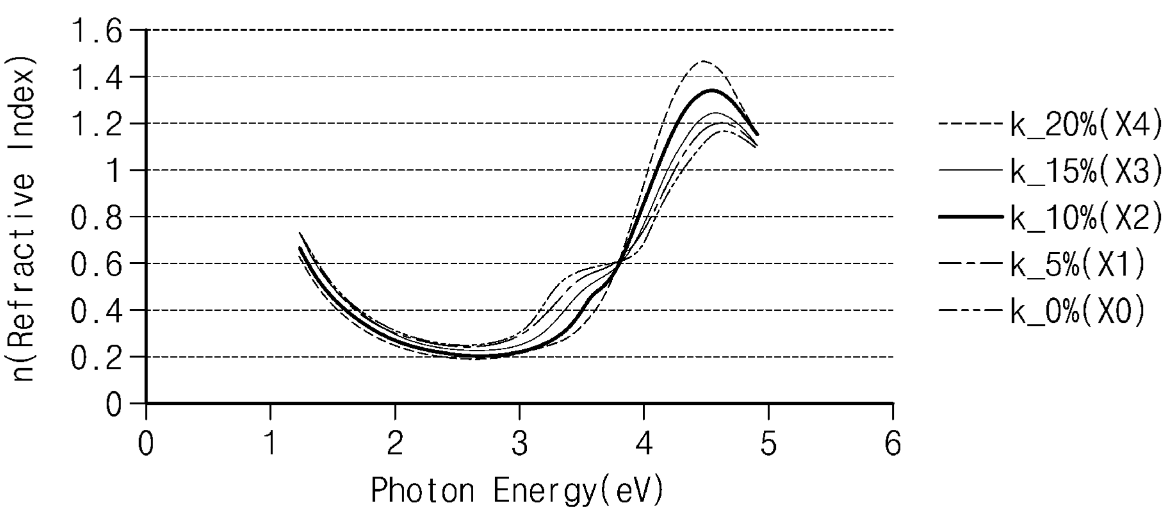
FIG. 5A and FIG. 5B are graphs showing a linear relation derived from one of the steps of FIG. 4.
Figure 5B:
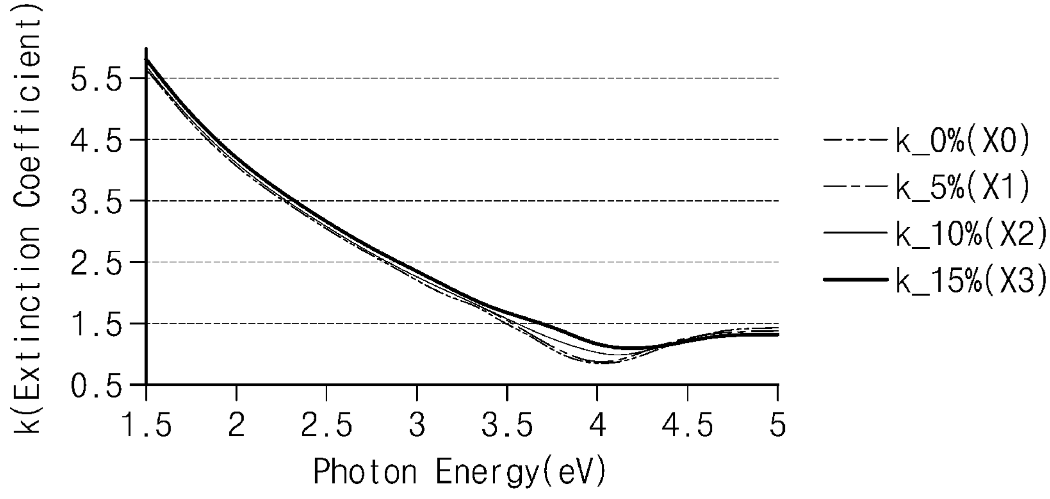
Figure 6:
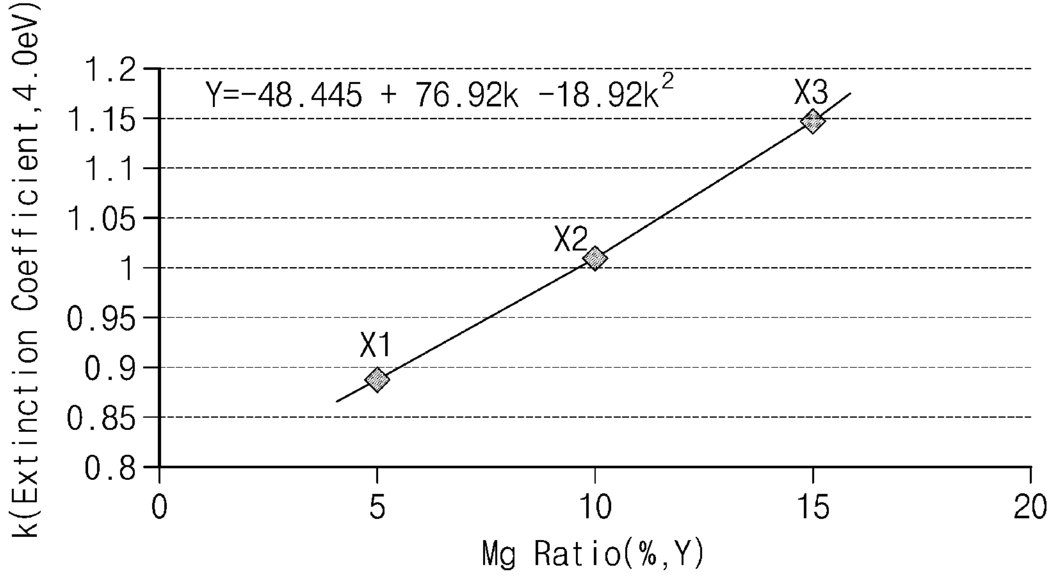
FIG. 6 is a graph showing a linear relation derived from the steps of FIG. 4.

FIG. 5A and FIG. 5B are graphs showing a linear relation derived from one of the steps of FIG. 4, and FIG. 6 is a graph showing a linear relation derived from the steps of FIG. 4.

Specifically, in FIG. 5A and FIG. 5B, the relation with an optical constant according to the wavelength of a light for each sample can be seen. In this case, each sample may have a different concentration of magnesium. Specifically, a base sample X0 may have a concentration of the second material (i.e., magnesium) of 0%, a first sample X1 may have a concentration of the second material (i.e., magnesium) of 5%, a second sample X2 may have a concentration of magnesium of 10%, a third sample X3 may have a concentration of magnesium of 15%, and a fourth sample X4 may have a concentration of magnesium of 20%.

In FIG. 5A, the relation between an electron volt (eV) value of photon energy and n (Refractive Index) according to the wavelength of a light may be seen. The relation between photon energy and n of the base sample X0, the first sample X1, the second sample X2, the third sample X3, and the fourth sample X4 may be confirmed.

In FIG. 5B, the relation between an eV value of photon energy and k (Extinction Coefficient) may be confirmed. The relationship between photon energy and k of the base sample X0, the first sample X1, the second sample X2, and the third sample X3 may be confirmed.

Referring to FIG. 6, the linear relation of an optical constant according to a material amount in a specific wavelength band (4 eV) can be seen. Specifically, the linear relations of k according to a Mg ratio (i.e., the concentration of magnesium) may be confirmed. The linear relation equation of FIG. 6 may be derived from the relation between photon energy and k of the first to third samples X1, X2, and X3, which are a part of the plurality of samples X0, X1, X2, X3, and X4 in the specific wavelength band (4.0 eV) of FIG. 5B. In this case, not only the relation among the first to third samples, but also a linear relation among some samples of the plurality of samples X0, X1, X2, X3, and X4 may be derived, but the embodiment of the invention is not limited to any one embodiment.

A derived linear relation equation between the two variables, extinction coefficient k and Mg ratio Y may be represented by $k=z*Y$ (where z is the proportionality coefficient between K and Y of a comparative sample), and the derived linear relation equation may be approximated to $Y=-48.445+76.92*K-18.92K^2$ as an example of an approximation equation.

In this case, the linear relation equation shown in FIG. 6 may be derived by an AI regression method, but is not limited thereto, and the linear relation equation may be derived by various methods.

At this time, the approximation equation of the derived linear relation equation may vary according to the type and manufacturing method of a thin film, such as a material constituting each sample, and is not fixed to any one value. In addition, a wavelength band representing a linear relation may also vary according to the type and manufacturing method of the thin film, such as the material constituting each sample.

If the k value of a specific sample is obtained with the linear relation equation calculated in FIG. 6, and when there is a difference in the amount of the second material, a material composition ratio and the like of the specific sample may be calculated.

Hereinafter, referring to FIG. 1 together, a step S108 of finally calculating the thickness of each material of the main sample of FIG. 1 through the steps S106, S107, S108, and M100 after the step S104 of FIG. 4 described with reference to FIG. 1 may be performed.

Through the step S105 of calculating an amount of material included in a sample from the main sample measured using the linear relation equation, an amount of material included in the main sample may be calculated.

That is, in this step, the amount of material included in the main sample may be calculated through a linear relation equation derived from the comparative samples and the k value of the main sample measured by the first measurement device 100.

Thereafter, through the step S106 of deriving a material composition ratio of the main sample, the material composition ratio of the main sample may be derived.

Thereafter, the step M100 of accumulating and utilizing data, and the step S107 of calculating a thickness ratio of the first layer and the second layer using the data and the material composition ratio may be performed.

That is, calculating a thickness ratio of a measurement target layer and a reference layer may be performed through the above steps. Also, in this step, the data measured and calculated through the previous step may be further accumulated in the aforementioned memory unit 500 (see FIG. 2C).

Finally, the step S108 of calculating the thickness of each of the first layer, the second layer, the measurement target layer, and the reference layer by using the total thickness and thickness ratio of the main sample measured above may be performed.

Hereinafter, the step M100 of accumulating data in the thin film analysis method according to an embodiment of the present invention will be described.

FIG. 7 is a flow chart specifically showing one step of the method for analyzing a thin film of FIG. 1.

In FIG. 7, it is possible to confirm the step M100 of accumulating and utilizing data in the thin film analysis method of FIG. 1 in detail. The step M100 of accumulating and utilizing the data stored in the memory unit 500 (see FIG. 3) includes preparing a sample in which the measurement target layer and the reference layer are stacked (M101), measuring a total thickness value of the sample using the first measurement device (M103), measuring the signal intensity of each material included in the sample using the second measurement device (M105), deriving the first linear relation equation between a signal intensity for a material and an material amount (M107), calculating the amount of material included in the sample from the measured signal intensity using the first linear relation equation (M109), calculating a material composition ratio of the sample (M111), deriving a second linear relation equation between the material amount of each material and a layer thickness (M113), calculating a thickness ratio of the measurement target layer and the reference layer using the second linear relation equation and the material composition ratio (M115), and calculating the thickness of each of the measurement target layer and the reference layer using the total thickness and the thickness ratio (M117).

Through the steps M100 shown in FIG. 7, data may be accumulated in the memory unit 500. Hereinafter, the step of accumulating data in the memory unit 500 may be performed by the sub-measurement unit 800 (see FIG. 2C) and the sub-calculation unit 700 (see FIG. 2C).

Hereinafter, with respect to an embodiment of the invention, the first sub-measurement unit 810 (see FIG. 2C) is described as the first measurement device 100 (see FIG. 2A), and the second sub-measurement unit 820 (see FIG. 2C) is described as the second measure device 200 (FIG. 2B).

Hereinafter, referring to FIG. 2 and FIG. 3 together, first, a sample in which a measurement target layer and a reference layer are stacked is prepared, a total thickness value of the sample is measured using the first measurement device 100, a signal intensity of each material included in the sample is measured using the second measurement device 200, a first linear relation equation between the signal intensity for the material and a material amount is derived, and the amount of material included in the sample is calculated from the signal intensity measured using the first measurement device 100, through which a material composition ratio of the sample may be calculated.

Thereafter, a second linear relation equation between the material amount of each material and a layer thickness is derived, a thickness ratio of the measurement target layer and the reference layer is calculated using the second linear relation equation and the material composition ratio, and the thickness of each of the measurement target layer and the reference layer may be calculated using the total thickness and the thickness ratio.

In this case, the first measurement device 100 may be a device which measures a thickness value and a physical properties value of a main sample and an auxiliary sample, but the embodiment of the invention is not limited thereto, and the total thickness value of a sample may be measured by various measurement devices.

Signal intensities I1, I2, and I3 are measured for first to third materials included in a sample using the aforementioned second measurement device 200, respectively.

The step of accumulating and utilizing data shown in FIG. 7 is an example of a step of accumulating and utilizing data of the invention, but the invention is not limited thereto, and data may be accumulated and utilized through various methods.

As confirmed above, data may also be accumulated and utilized through the thin film measurement method of the invention.

In order to calculate the signal intensities of materials included in a sample into a material amount, deriving the first linear relation equation between the signal intensity and the material amount for each of the first to third materials is required.

Figure 8:
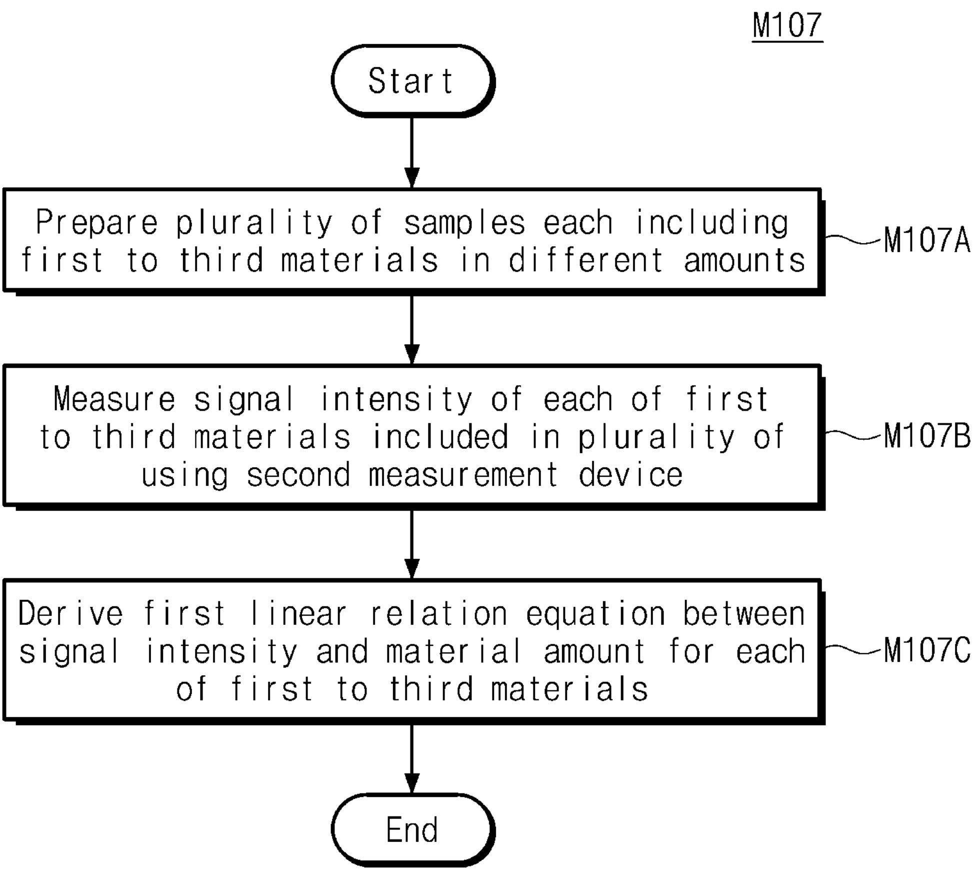
FIG. 8 is a flow chart specifically showing one step of the method for analyzing a thin film of FIG. 7.

FIG. 8 is a flow chart specifically showing one step of the method for analyzing a thin film of FIG. 7, and FIG. 9A to FIG. 9C are graphs showing a linear relation derived from the steps of FIG. 7.

Figure 9A:
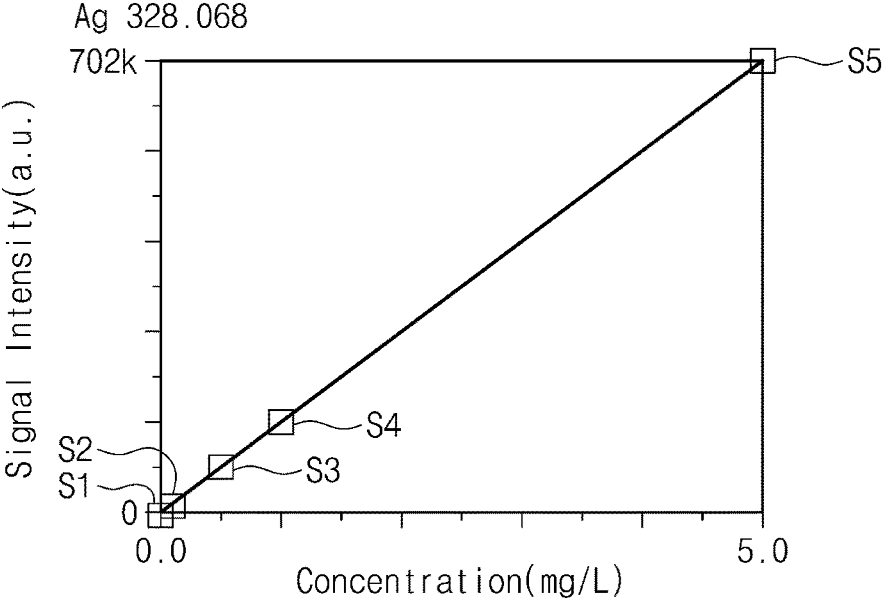
FIG. 9A to FIG. 9C are graphs showing a linear relation derived from the steps of FIG. 7.
Figure 9B:
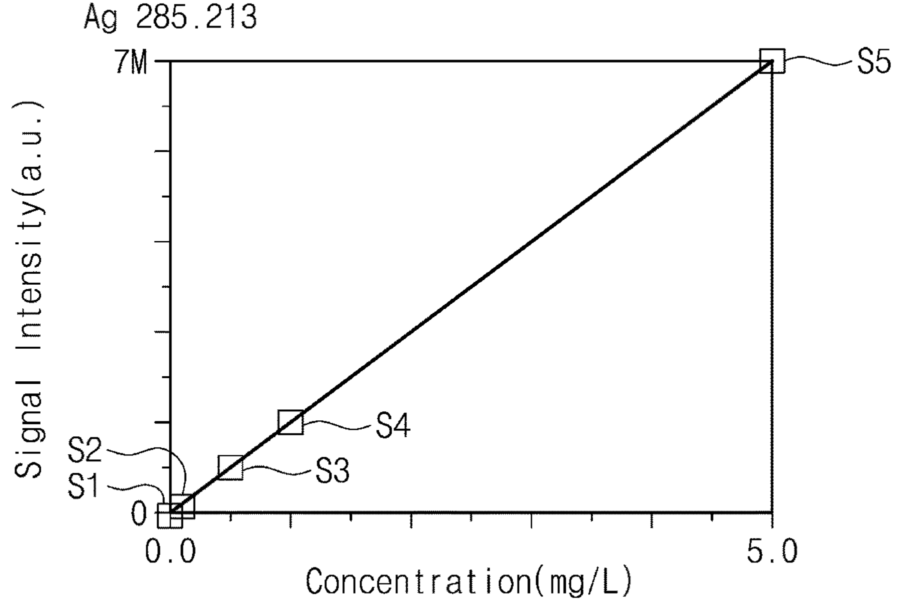
Figure 9C:
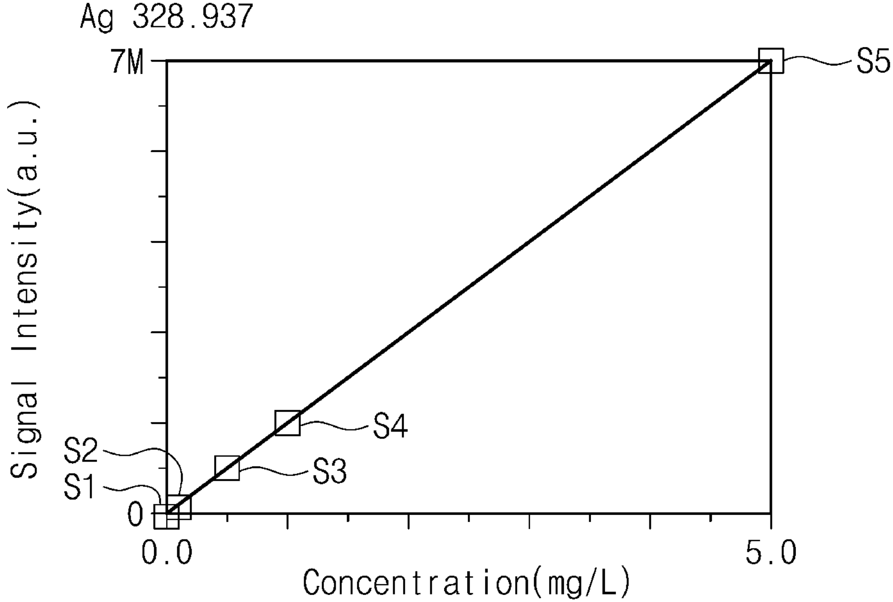

Specifically, FIG. 9A to FIG. 9C are graphs showing a linear relation derived by the step M107 of deriving the first linear relation equation in FIG. 8.

The step M107 of deriving the first linear relation equation may include preparing a plurality of samples each including first to third materials in different amounts (M107A), measuring the signal intensity of each of the first to third materials included in the plurality of samples using the second measurement device (M107B), and deriving the first linear relation equation between the signal intensity and the material amount for each of the first to third materials (M107C).

Referring to FIG. 8, and FIG. 9A to FIG. 9C, first, a plurality of samples such as a first sample S1, a second sample S2, a third sample S3, a fourth sample S4, and a fifth sample S5 each including the first to third materials in different amounts from each other are prepared. In this step, the first to fifth samples S1 to S5 may be prepared to be subjected to mass spectrometry through pre-treatment processes of adding a mixed solution of a nitric acid and deionized water ("DI" water), followed by heating and drying, and then additionally adding pure water thereto.

Thereafter, using the second measurement device 200, signal intensities of the first to third materials included in each of the first to fifth samples S1 to S5 are measured. The "signal intensity" of each material may be represented by light of different wavelength bands unique to each material.

Thereafter, on the basis of the material amount known for each sample in the sample preparation step and the signal intensity value measured in the signal intensity measurement step, the first linear relation equation between the signal intensity and the material amount for each of the first to third materials may be derived.

Referring to FIG. 9A to FIG. 9C, the second material (Ag) included in the first to fifth samples S1 to S5 has a signal intensity value at a wavenumber of 328.068 cm−1. In this case, the relation between a material amount M2 of the second material (Ag) and a signal intensity value I2 in each of the first to fifth samples S1 to S5 may be marked as shown in the graph of FIG. 9A, whereby a 1-2 linear relation equation (M2=I2*p2, where p2 is a proportionality coefficient between the signal intensity I2 and the material amount M2 of the second material) between the two variables M2 and I2 may be derived.

The third material (Mg) included in the first to fifth samples S1 to S5 has a signal intensity value at a wavenumber of 285.213 cm−1. In this case, the relation between a material amount M3 of the third second material (Mg) and a signal intensity value I3 in each of the first to fifth samples S1 to S5 may be marked as shown in the graph of FIG. 9B, whereby a 1-3 linear relation equation (M3=I3*p3, where p3 is a proportionality coefficient between the signal intensity I3 and the material amount M3 of the third material) between the two variables I3 and M3 may be derived.

The first material (Yb) included in the first to fifth samples S1 to S5 has a signal intensity value at a wavenumber of 328.937 cm−1. In this case, the relation between a material amount M1 of the first material (Yb) and a signal intensity value I1 in each of the first to fifth samples S1 to S5 may be marked as shown in the graph of FIG. 9C, whereby a 1-1 linear relation equation (M1=I1*p1, where p1 is a proportionality coefficient between the signal intensity I1 and the material amount M1 of the first material) between the two variables I1 and M1 may be derived.

Hereinafter, for convenience of description, the 1-1, 1-2, and 1-3 linear relation equations (M1=I1*p1, M2=I2*P2, and M3=I3*p3) are collectively referred to as a first linear relation M=I*p (where p is a proportionality coefficient between the signal intensity I and the material amount M of a material).

When the first linear relation equation is derived, material amounts M1, M2, and M3 of the first to the third material included in the sample SP may be calculated by using the signal strength values I of the first to third materials measured in advance and the first linear relation M=I*p. In addition, based on the material amount of the first to third materials, a material composition ratio M1:M2:M3 of the sample SP may be calculated. The material composition ratio is an element concentration ratio, and the material composition ratio may be calculated into a mass concentration ratio by using the molecular weight of each material.

In order to calculate the material amount of the sample SP into the layer thickness or to calculate the material composition ratio into the thickness ratio, the second linear relation equation T=M*q (where q is a proportionality coefficient between the material amount M and the thickness value T). That is, a 2-1 linear relation equation T1=M1*q1 (where q1 is a proportionality coefficient between a material amount M1 and a thickness value T1 in the first material) between the material amount M1 of the first material and a layer thickness T1, a 2-2 linear relation equation T2=M2*q2 (where q2 is a proportional coefficient between a material amount M2 and a thickness value T2 in the second material) between the material amount M2 and a layer thickness T2, and a 2-3 linear relation equation T3=M3*q3 (where q3 is a proportionality coefficient between a material amount M3 and a thickness value T3 in the third material) between the material amount m3 and a layer thickness T3 may be derived.

Figure 10:
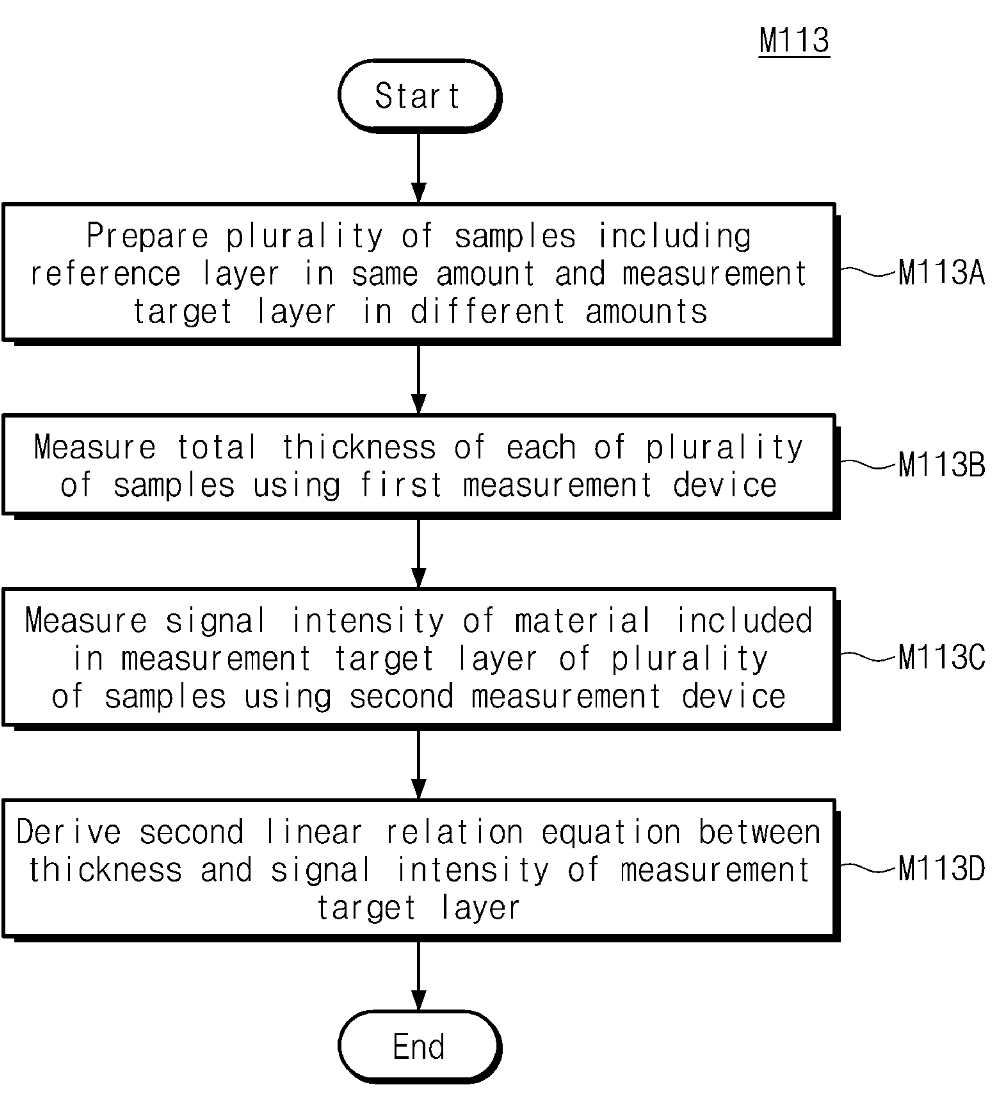
FIG. 10 is a flow chart specifically showing one of the steps of FIG. 7.
Figure 11:
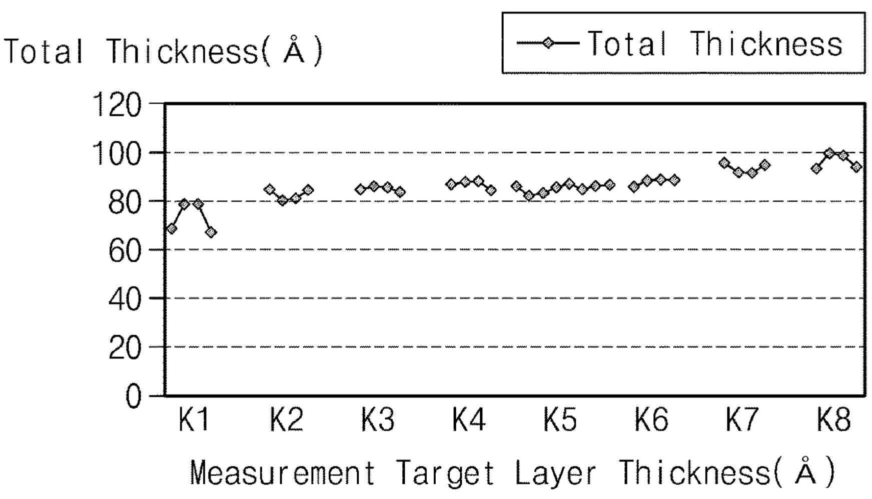
FIG. 11 is a graph obtained from one of the steps of FIG. 10.
Figure 12:
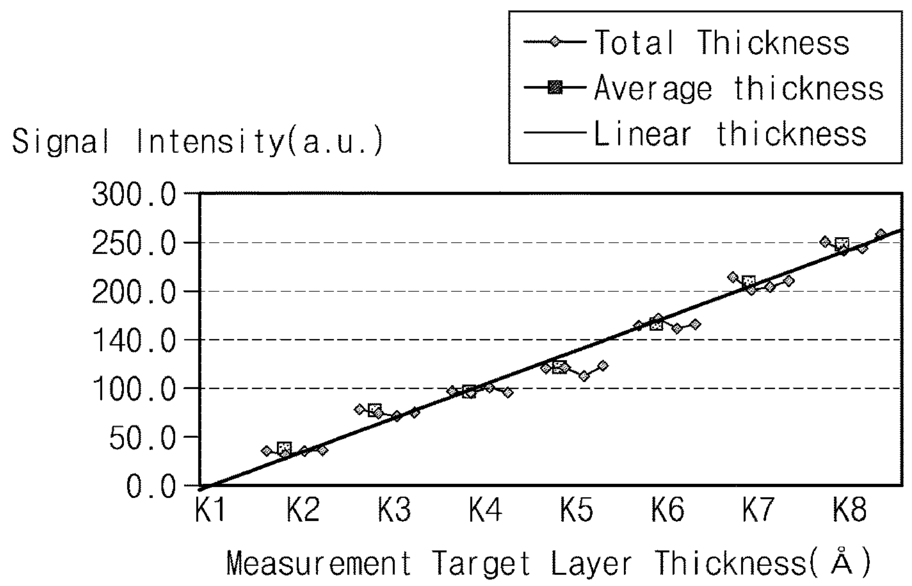
FIG. 12 is a graph obtained from one of the steps of FIG. 10.

FIG. 10 is a flow chart specifically showing one of the steps of FIG. 7, FIG. 11 is a graph obtained from one of the steps of FIG. 10, and FIG. 12 is a graph obtained from one of the steps of FIG. 10.

Specifically, FIG. 10 is a flow chart specifically showing the step M113 of deriving a second linear relation equation in FIG. 7. FIG. 11 is a graph obtained by measuring the total thickness of a plurality of samples in the step of deriving the second linear relation equation in FIG. 10, and FIG. 12 is a graph obtained by measuring the signal intensity of a material included in the measurement target layer of the plurality of samples in the step of deriving the second linear relation equation in FIG. 10.

The step M113 of deriving the second linear relation equation may include preparing a plurality of samples including a reference layer in the same amount and a measurement target layer in different amounts (M113A), measuring the total thickness of each of the plurality of samples using the first measurement device (M113B), measuring the signal intensity of a material included in the measurement target layer of the plurality of samples using the second measurement device (M113C), and deriving the second linear relation equation between the thickness and the signal intensity of the measurement target layer (M113D).

Referring to FIGS. 10 to 12, first, a plurality of samples such as a first sample K1, a second sample K2, a third sample K3, a fourth sample K4, a fifth sample K5, a sixth sample K6, a seventh sample K7, an eighth sample K8, and the like may be prepared, wherein the thickness of the reference layer including first and second materials is the same as each other, and the thickness of the measurement target layer including a third material in different amounts is different from each other.

In this case, different amounts or different thicknesses of the measurement target layer may be approximately adjusted by the amount of a material input during a process of forming the measurement target layer. The first sample K1 may be a sample which does not include the measurement target layer, and the second to eighth samples K2 to K8 may be samples in which the material amount and thickness of a measurement target layer are changed by a predetermined increase amount.

Thereafter, using the first measurement device 100, a total thickness value of each of the first to eighth samples K1 to K8 is measured. Referring to FIG. 11, the total thickness value of the eighth sample K8 is about 100 angstroms (Å), which is increased from the total thickness value of the first sample K1 of about 70 Å. That is, the measurement target layer has a split thickness from 0 Å to about 30 Å in each of the first to eighth samples K1 to K8.

Using the second measurement device 200, the signal intensity I3 of the third material included in each of the first to eighth samples K1 to K8 are measured. Referring to FIG. 12, signal intensity values which increase by a constant increase amount may be measured for the split thickness split from 0 to about 30 Å of each of the first to eighth samples K1 to K8. Accordingly, a linear relation equation T3=I3*k (where k is a proportionality coefficient between a signal intensity value I3 and a thickness value T3 in the third material) between a thickness value T3 and a signal intensity value I3 of the measurement target layer of the first to eight samples K1 to K8 may be derived.

Furthermore, since the signal intensity value I3 may be represented as the material amount value M3 using the above-described first linear relation equation M3=I3*p3, the 2-3 linear relation equation T3=M3*q3 between the thickness value T3 and the material amount value M3 of the third material may be derived.

In the same manner, through a similar process, the 2-1 linear relation equation T1=M1*q1 between the thickness value T1 and the material amount value M1 of the first material, and the 2-2 linear relation equation T2=M2*q2 between the thickness value T2 and the material amount value M2 of the second material may be derived. That is, a plurality of samples each including a measurement target layer in the same thickness, and a reference layer in different amounts or different thicknesses are prepared, and then, on the basis the total thickness value, signal intensity value, and material amount value of the reference layer, the 2-1 and 2-2 linear relation equations between the thickness value and the material amount value for the first and second materials may be derived.

Referring back to FIG. 7, the signal intensity I for the first to third materials included in the sample SP is measured, and then, using the first linear relationship M=I*p between the signal intensity I and the material amount M, the material amount values M1, M2, and M3 or the material composition ratio M1:M2:M3 of the first to third materials is calculated, and using the second linear relation equation T=M*q between the material amount M and the thickness value T, the thickness values T1, T2, and T3 and/or the thickness ratio T1:T2:T3 of the first to third materials may be obtained.

As described above, through the second linear relation equation, the thickness values T1, T2, and T3 of the first to third materials may be calculated directly, but when a sample SP having a large surface area is used as a target to be measured, there is a an advantage in that an error due to the surface area may be removed by using the thickness ratio T1:T2:T3, but when a sample SP having a large surface area is a target to be measured, there is a practical benefit in that an error due to the surface area may be eliminated by using the thickness ratio T1:T2:T3. Accordingly, the thickness of each layer may be calculated using the total thickness value Tsp of the sample SP and the thickness ratio T1:T2:T3.

Alternatively, using the signal intensity values and proportionality coefficients of the first to third materials, a method of directly deriving a thickness value through the following relation equations (1) to (3) may be used.

$$T1=M1*q1=I1*p1*q1 \tag{1}$$

$$T2=M2*q2=I2*p2*q2 \tag{2}$$

$$T3=M3*q3=I3*p3*q3 \tag{3}$$

Alternatively, if a material composition ratio r1:r2:r3 of the first to third materials of the sample SP is known, a method of deriving a thickness value of each layer using the proportional coefficients and the total thickness value Tsp may be used. That is, the thickness ratio of the first to third materials may be represented by the following relation expression (4).

$$T1:T2:T3=r1*q1:r2*q2:r3*q3 \tag{4}$$

Accordingly, thickness values of the first to third materials with respect to the total thickness value T may be calculated as in the following relation equations of (5) to (7).

$$T1 = T * \frac{r1 * q1}{r1 * q1 + r2 * q2 + r3 * q3} \quad (5)$$

$$T2 = T * \frac{r2 * q2}{r1 * q1 + r2 * q2 + r3 * q3} \quad (6)$$

$$T3 = T * \frac{r3 * q3}{r1 * q1 + r2 * q2 + r3 * q3} \quad (7)$$

Such a calculation process may be performed by the sub-calculation unit 700 described above. In an embodiment, the sub-calculation unit 700 may include the first sub-calculation unit 710 configured to calculate and store the first linear relation equation representing a linear relation between the material amount and signal intensity of a material included in the sample SP, and a second sub-calculation unit 720 configured to calculate a material composition ratio of the sample by using the first linear relation equation and the signal intensity value of the material included in the sample, calculate a thickness ratio of thin film layers constituting the sample by using the material composition ratio and the second linear relation equation, and calculate the thickness of each of the first and second layers by using the total thickness value and the thickness ratio.

As described above, according to an embodiment of the invention, through the sub-measurement unit 800 and the sub-calculation unit 700, the thickness of an individual thin film layer included in a sample may be calculated on the basis of quantitative values of a material, such as the signal intensity, material amount, and/or material composition ratio of a material included in a sample, the total thickness value of the sample, and a linear relation equation or a proportionality coefficient between the above-described variables.

In addition, through the above method, the thickness of each material of a sample having a plurality of layers composed of any one among a single metal material, an alloy including a plurality of metal materials, and an organic material may be measured. In addition, the embodiment of the invention is not limited thereto, and the thickness of each of a host and a dopant in a sample including both the host and the dopant doped in the host may be measured in another embodiment.

Information measured and calculated through the sub-measurement unit 800 and the sub-calculation unit 700 may be calculated into data and stored in the memory unit 500, and the information may be utilized in the thin film analysis method and the thin film analysis device described above.

As a method for accumulating and utilizing data, various methods for accumulating data may be used as well as the case of using the first measurement device 100 and the second measurement device 200 described above, and the accumulated data may be utilized.

FIG. 13 is a flowchart showing each step of a method for analyzing a thin film according to another embodiment of the invention.

Referring to FIG. 13, a method for analyzing a thin film according to FIG. 13 is similar to the method for analyzing a thin film of FIG. 1, but there may be some differences in measurement devices used according to the difference in the type of a sample to be measured. However, the same measurement device may be used, and the embodiment of the invention is not limited to any one measurement device.

The thin film analysis method and the thin film analysis device according to an embodiment of the invention may be applied to case of measuring a sample including a host and a dopant doped in the host, for example, a dopant layer in a light emitting element structure.

The method for analyzing a thin film according to FIG. 13 may include preparing a plurality of samples including a host and a dopant added to the host (S200), measuring a total thickness value of a main sample using a first measurement device (S201), measuring a physical properties value of the main sample by using the first measurement device (S202), measuring physical properties values of auxiliary samples by using the first measurement device (S203), deriving a linear relation equation between a physical properties value–a material amount for a material (S204), calculating an amount of material included in a sample from the main sample measured by using the linear relation equation (S205), accumulating and utilizing data (M200), calculating a thickness ratio of the host and the dopant by using the data and a material composition ratio (S207), calculating the thickness of each of the host and the dopant by using the total thickness and thickness ratio (S208). Each of the steps S200 to S208, and M200 is similar to those of the thin film analysis method of FIG. 1 described above.

Specifically, a sample may have a structure in which an electron injection layer, an electron transport layer, a light emitting layer, a hole injection layer, and a hole transport layer are stacked between a positive electrode and a negative electrode.

In this case, the light emitting layer may include a first light emitting layer and a second light emitting layer having different types of dopant and different doping concentrations, and accordingly, the luminous color of each light emitting layer may be different from each other. For example, the first light emitting layer may be a red light emitting layer including a first dopant to a first concentration, and the second light emitting layer may be a green light emitting layer including a second dopant to a second concentration. A dopant is an organic material and may have a structure in which a metal element is included in a ligand. The dopant may be one of Ir(PPy)3, Ir(BQ)3, Ir(ThPy)3, Ir(BO)3, Ir(BT)3, Ir(BTPy)3, Ir(BQ)2acac, Ir(ThPy)2acac, and the like, but is not limited thereto.

Since the first and second light emitting layers have a structure in which a trace amount of dopant is doped in a host, the thickness of a dopant layer may be less than the measurement limit of a first measurement device. Accordingly, the thickness of each of the first and second light emitting layers may be measured using the above-described thin film analysis method. Since the dopant has a structure of a metal element core and a ligand bound thereto, the material amount of the dopant itself may be obtained indirectly by measuring the signal intensity of the metal element core. Accordingly, the thickness by the dopant in a sample may be obtained.

In the same manner as described above, a thickness ratio of the first and second light emitting layers and other layers and/or thickness values thereof may be obtained.

In addition, the thin film analysis method and the thin film analysis device may be applied to an organic matter layer. In this case, a measurement target of the thin film analysis method may be a sample including a host and a dopant of an organic material doped with the host. In this case, the thickness of only an undoped portion and the thickness of the dopant may be measured.

The thin film analysis method using the thin film analysis device is as described above. In this case, unlike the above-described second measurement device, a mass spectrometry technique using Raman spectroscopy may be used. Even in this case, a linear relation between a signal intensity and a material amount may be obtained as described above.

First, a sample including a host and a dopant of an organic material doped with the host is prepared, and using a first measurement device, a total thickness value of the sample is measured. Thereafter, the signal intensity is measured for the host and the dopant, and a first linear relation equation between the signal intensity and a material amount is derived. Accordingly, using the first linear relation equation, a material amount and/or a material composition ratio of the sample may be obtained. Thereafter, a second linear relation equation between the material amount and a thickness value is derived, and using the second linear relation equation, the thickness ratio and/or the thickness value of host and dopant layers may be obtained.

Figure 14:
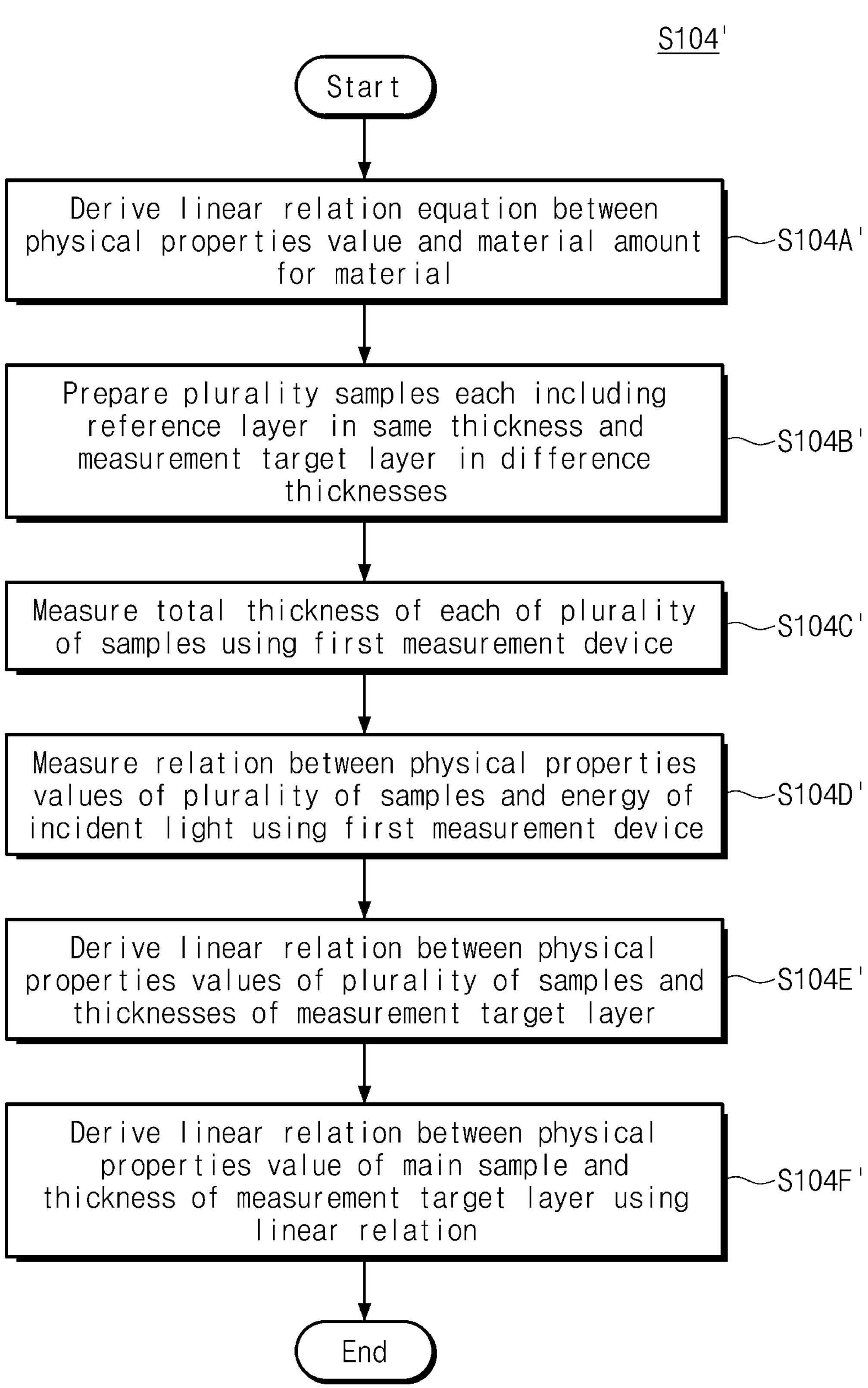
FIG. 14 is a flow chart showing one step of the method for analyzing a thin film according to an embodiment of layer present invention.

FIG. 14 is a flow chart showing one step of the method for analyzing a thin film according to an embodiment of layer present invention. Specifically, when compared to FIG. 4, in the step S104 of FIG. 4, a linear relation equation is derived from the relation between the material amount of a second material in a plurality of samples—wavelength of a light by varying the amount of the second material, whereas in a step S104' of FIG. 14, a linear relation equation may be derived from the relation between the thickness of a measurement target layer of a plurality of samples—wavelength of a light.

Referring to FIG. 14, deriving a linear relation equation between a physical properties value and a material amount for a material (S104A') may include preparing a plurality samples each including a reference layer in the same thickness and a measurement target layer in difference thicknesses (S104B'), measuring the total thickness of each of the plurality of samples using a first measurement device (S104C'), measuring the relation between physical properties values of the plurality of samples and the energy of an incident light using the first measurement device (S104D'), deriving a linear relation between the physical properties values of the plurality of samples and the thicknesses of the measurement target layer (S104E'), deriving a linear relation between a physical properties value of a main sample and the thickness of a measurement target layer using the linear relation (S104F').

As described above, the thin film analysis method and the thin film analysis device of the invention may measure the thickness of each material having a plurality of layers composed of any one among a single metal material, an alloy including a plurality of metal materials, and an organic material. In addition, the embodiment of the invention is not limited thereto, and the thickness of each of a host and a dopant in a sample including both the host and the dopant doped in the host may be measured in another embodiment. In addition, a destructive analysis method or a non-destructive analysis method may be selected as necessary, and the same sample may be repeatedly used.

A thin film analysis method and a thin film analysis device according to an embodiment of the invention may measure and monitor the thickness of a thin film having a thickness equal to or less than the measurement limit of the thin film analysis device.

A thin film analysis method and a thin film analysis device according to an embodiment of the invention may form the thickness of a thin film to an optimal value to secure the driving reliability of the device, and simultaneously, prevent an increase in production costs and degradation in device performance.

Although the present invention has been described with reference to preferred embodiments of the present invention, it will be understood by those skilled in the art that various modifications and changes in form and details may be made therein without departing from the spirit and scope of the present invention as set forth in the following claims. Accordingly, the technical scope of the present invention is not intended to be limited to the contents set forth in the detailed description of the specification, but is intended to be defined by the appended claims.

What is claimed is:

1. A method for analyzing a thin film, the method comprising:

preparing a main sample and a plurality of comparative samples, each of which includes a first layer composed of a first material and a second layer composed of a second material and a third material, wherein the first layer and the second layer are stacked, and each of the plurality of comparative samples has a same amount of the first material and the third material as the main sample but has a different amount of the second material from the main sample;

measuring a total thickness of the main sample;

measuring optical constants of the main sample and the comparative samples;

deriving a linear relation equation representing a linear relation between each of the optical constants of the main sample and the comparative samples and the material amount of the second material of a corresponding one of the main sample and the comparative samples; and calculating a material composition ratio of the main sample based on the linear relation equation and the material amount of the second material of the main sample.

2. The method of claim 1, wherein the measuring of the total thickness of the main sample and the measuring of optical constants of the main sample and the comparative samples are performed by a first measurement device.

3. The method of claim 2, wherein at least one of the first layer and the second layer is a thin film having a thickness equal to or less than a measurement limit of the first measurement device.

4. The method of claim 2, wherein the first measurement device is a device configured to use a change in a polarization state from a light incident on the main sample or the comparison samples into a light reflected from the main sample or the comparison samples.

5. The method of claim 1, wherein the linear relation equation is derived based on a relation between the optical constant of the main sample and an energy of a light incident on the main sample and a relation between the optical constants of the comparative samples and an energy of a light incident on the comparative samples.

6. The method of claim 5, wherein the linear relation equation is derived based on a specific wavelength region of the light incident on the main sample or the comparison samples.

7. The method of claim 1, wherein the optical constant of the main sample or one of the comparative samples includes refractive index or extinction coefficient.

8. The method of claim 1, wherein:

each of the first material and the second material is different from the third material; and each of the first layer and the second layer is one of a single metal material, an alloy including a plurality of metal materials, and an organic material.

9. The method of claim 1, further comprising:

calculating a thickness of each of the first layer and the second layer of the main sample based on the material composition ratio of the main sample and the total thickness of the main sample.

10. The method of claim 9, wherein the calculating of the thickness comprises:

utilizing data on a relation between the material amount of the main sample and a thickness ratio between the first layer and the second layer of the main sample or a relation between the material composition ratio of the main sample and the thickness ratio of the main sample; and calculating the thickness of each of the first layer and the second layer of the main sample based on the total thickness of the main sample and the thickness ratio of the main sample.

11. The method of claim 10, further comprising:

preparing a plurality of first auxiliary samples including the first material and the second material in different amounts;

measuring signal intensities of the first and second materials included in each of the plurality of first auxiliary samples using a second measurement device;

deriving a first linear relation equation by calculating a linear relation between the material amount of the first material and the signal intensity thereof and a linear relation between the material amount of the second material and the signal intensity thereof;

preparing a plurality of second auxiliary samples having a same thickness of the second layer as a corresponding thickness of the main sample and having a different thickness of the first layer from a corresponding thickness of the main sample;

preparing a plurality of third auxiliary samples having a same thickness of the first layer as the corresponding thickness of the main sample and having a different thickness of the second layer from the corresponding thickness of the main sample;

measuring a total thickness of the plurality of second auxiliary samples and a total thickness of the plurality of third auxiliary samples;

measuring a signal intensity of the first material included in each of the plurality of second auxiliary samples, and calculating the measured signal intensity of the first material into a material amount based on the first linear relation equation;

measuring the signal intensity of the second material included in each of the plurality of third auxiliary samples, and converting the measured signal intensity of the second material into a material amount based on the first linear relation equation; and deriving a second linear equation by calculating a linear relation between a thickness of a layer composed of the first material and the material amount of the first material and a linear relation between a thickness of a layer composed of the second material and the material amount of the second material, Wherein the utilized data comprises the first linear relation equation and the second linear relation equation.

12. The method of claim 11, wherein the signal intensity measured by the second measurement device is measured by at least one of Inductive Coupled Plasma-Mass Spectrometry (ICP-MS), Raman Spectroscopy, Time of Flight Secondary Ion Mass Spectrometry (TOF-SIMS), or Laser Induced Breakdown Spectroscopy (LIBS).

13. A method for analyzing a thin film, the method comprising:

preparing a main sample in which a first layer and a second layer, which are composed of a plurality of materials, are stacked, and a plurality of comparative samples composed of a plurality of materials substantially the same as the materials of the main sample, wherein one of the plurality of materials is a comparative material having a different amount of material compared to the main sample;

measuring a total thickness of the main sample;

measuring optical constants of the main sample and the comparative samples;

deriving a linear relation equation representing a linear relation between each of the optical constants of the main sample and the comparative samples and the material amount of the main sample and a corresponding one of the comparative materials among the comparative samples; and calculating a material composition ratio of the main sample based on the linear relation equation and the material amount of a material corresponding to the comparative material among the plurality of materials of the main sample.

14. The method of claim 13, wherein the measuring of the total thickness of the main sample and the measuring of optical constants of the main sample and the comparative samples are performed by a measurement device, wherein the measurement device is a device configured to use a change in a polarization state from a light incident on the main sample or the comparison samples into a light reflected from the main sample or the comparison samples.

15. The method of claim 13, wherein in the deriving of the linear relation equation, the linear relation equation is derived based on a relation between the measured optical constant of the main sample and an energy of a light incident on the main sample and a relation between the measured optical constants of the comparative samples and an energy of a light incident on the comparative samples.

16. The method of claim 13, wherein the optical constant of the main sample or the comparative samples is at least one of refractive index and extinction coefficient.

17. The method of claim 13, further comprising:

calculating a thickness of each layer composed of the plurality of materials of the main sample based on the material composition ratio of the main sample and the total thickness of the main sample, wherein the calculating of the thickness includes:

utilizing data on a relation between the material amount of the main sample and a thickness ratio between the first layer and the second layer of the main sample or a relation between the material composition ratio of the main sample and the thickness ratio of the main sample; and calculating the thickness of each layer of the main sample based on the total thickness of the main sample and the thickness ratio of the main sample.

18. A device for analyzing a thin film, the device comprising:

a measuring unit disposed on a sample stage and configured to measure a total thickness of a sample land an optical constant of the sample;

a memory unit configured to store data on an optical constant of an auxiliary sample substantially the same as the sample; and a calculation unit configured to receive a value of the total thickness of the sample and the optical constant of the sample measured by the measuring unit, and the stored data from the memory unit and calculate a thickness of each of a plurality of thin film layers included in the sample, wherein the memory unit further stores a relation between a material amount and the optical constant, a relation between the material amount and a material composition ratio, and a relation between the material amount and a layer thickness.

19. The device of claim 18, further comprising:

a first sub-measurement unit configured to measure a value of a total thickness of the auxiliary sample;

a second sub-measurement unit configured to quantitatively measure materials included in the auxiliary sample to measure a signal intensity value of the auxiliary sample; and a sub-calculation unit configured to receive the value of the total thickness of the auxiliary sample obtained from the first sub-measurement unit and the signal intensity value of the auxiliary sample obtained from the second sub-measurement unit, and calculate a thickness of each of a plurality of thin film layers included in the auxiliary sample, wherein the first sub-measurement unit, the second sub-measurement unit, and the sub-calculation unit accumulatively generate data accumulated in the memory unit.

20. The device of claim 19, wherein the data accumulated in the memory unit further comprises data calculated from the measurement unit and the calculation unit.

21. The device of claim 19, wherein the sub-calculation unit comprises:

a first sub-calculation unit configured to calculate and store a first linear relation equation representing a linear relation between the material amount and signal intensity of a material included in the auxiliary sample, and a second linear relation equation representing a linear relation between the material amount and a layer thickness of the material; and a second sub-calculation unit configured to calculate a material composition ratio of the auxiliary sample by using the first linear relation equation and the signal intensity value of the material included in the auxiliary sample, calculate a thickness ratio of the thin film layers constituting the auxiliary sample by using the material composition ratio and the second linear relation equation, and calculate the thickness of each of the first and second layers by using the total thickness value and the thickness ratio.

22. The device of claim 19, wherein the measuring device or the first sub-measurement device is a device configured to use a change in a state from a light incident on the sample into a light reflected from the sample.

* * * * *